(12) United States Patent
Takata et al.

(10) Patent No.: US 8,690,972 B2
(45) Date of Patent: Apr. 8, 2014

(54) HYDROGEN PRODUCTION SYSTEM AND REFORMING APPARATUS

(75) Inventors: Yoshinori Takata, Kako-gun (JP); Masanori Miyake, Kako-gun (JP); Toshihiko Sumida, Kako-gun (JP)

(73) Assignee: Sumitomo Seika Chemicals Co., Ltd., Hyogo (JP)

( * ) Notice: Subject to any disclaimer, the term of this patent is extended or adjusted under 35 U.S.C. 154(b) by 1215 days.

(21) Appl. No.: 11/631,536

(22) PCT Filed: Jul. 7, 2005

(86) PCT No.: PCT/JP2005/012538
§ 371 (c)(1),
(2), (4) Date: Jan. 4, 2007

(87) PCT Pub. No.: WO2006/006479
PCT Pub. Date: Jan. 19, 2006

(65) Prior Publication Data
US 2007/0237691 A1 Oct. 11, 2007

(30) Foreign Application Priority Data
Jul. 12, 2004 (JP) ................................. 2004-204822

(51) Int. Cl.
*B01J 7/00* (2006.01)
(52) U.S. Cl.
USPC ................ 48/61; 48/127.1; 48/127.9; 48/76; 422/187; 422/600; 422/608; 422/612; 422/618; 422/620; 422/621; 422/625; 422/629; 422/630; 422/643; 422/198

(58) Field of Classification Search
USPC ................ 48/127.9, 127.1, 61; 422/188–189, 422/196–197; 423/210, 19–20; 431/268
See application file for complete search history.

(56) References Cited

U.S. PATENT DOCUMENTS

| 3,962,411 | A | * | 6/1976 | Setzer et al. ................... 423/651 |
| 6,126,908 | A | | 10/2000 | Clawson et al. |
| 6,887,603 | B2 | * | 5/2005 | Kasahara et al. ............... 429/17 |

(Continued)

FOREIGN PATENT DOCUMENTS

| CN | 1203187 | 12/1998 |
| CN | 1228749 | 9/1999 |

(Continued)

*Primary Examiner* — Kaity V. Handal
(74) *Attorney, Agent, or Firm* — Hamre, Schumann, Mueller & Larson, P.C.

(57) ABSTRACT

A hydrogen production system (X1) according to the present invention includes a reforming apparatus (Y1) having a vaporizer (1) and a reforming reactor (2), and a PSA apparatus (5). In the vaporizer (1) a mixed material (hydrocarbon-based material, water, and oxygen) is heated and vaporized. In the reforming reactor (2), steam reforming reaction and partial oxidation reaction of the hydrocarbon-based material take place at a time, so that reformed gas (containing hydrogen) is led out from the vaporized mixed material. In the PSA apparatus (5), the reformed gas is introduced into an adsorption tower loaded with an adsorbing agent, so that an unnecessary component in the gas is adsorbed by the adsorbing agent and hence hydrogen-rich gas is led out of the tower, while the unnecessary component is desorbed from the adsorbing agent, so that hydrogen-containing desorbed gas that contains the unnecessary component and hydrogen remaining in the tower is discharged out of the tower. The desorbed gas is burnt in the vaporizer (1), and combustion gas generated by burning the desorbed gas is utilized as a heat source to heat the mixed material.

12 Claims, 10 Drawing Sheets

(56) References Cited

U.S. PATENT DOCUMENTS

| | | |
|---|---|---|
| 7,135,050 B2 | 11/2006 | Asou et al. |
| 7,517,372 B2 * | 4/2009 | Sennoun et al. ............. 48/127.9 |
| 2001/0009653 A1 | 7/2001 | Clawson et al. |
| 2001/0023034 A1 * | 9/2001 | Verykios ......................... 429/17 |
| 2001/0045061 A1 * | 11/2001 | Edlund et al. .................... 48/76 |
| 2002/0110503 A1 | 8/2002 | Gittleman et al. |
| 2002/0110504 A1 | 8/2002 | Gittleman et al. |
| 2002/0172630 A1 | 11/2002 | Ahmed et al. |
| 2003/0046867 A1 | 3/2003 | Woods et al. |
| 2004/0047799 A1 | 3/2004 | Randhava et al. |
| 2005/0217180 A1 * | 10/2005 | Reinke et al. ................ 48/127.9 |

FOREIGN PATENT DOCUMENTS

| | | |
|---|---|---|
| CN | 1388791 | 1/2003 |
| EP | 0 247 384 | 12/1987 |
| JP | 401122901 * | 5/1989 |
| JP | 9-309703 | 12/1997 |
| JP | 2002-356309 | 12/2002 |
| JP | 2003-335502 | 11/2003 |

* cited by examiner

HYDROGEN PRODUCTION SYSTEM AND REFORMING APPARATUS

TECHNICAL FIELD

The present invention relates to a hydrogen production system and a reforming apparatus that can be utilized for industrially producing hydrogen from a hydrocarbon-based material.

BACKGROUND ART

A known hydrogen production system for industrially producing hydrogen includes a reforming reactor in which a hydrocarbon-based material such as methanol or natural gas is reacted for reformation to turn into a reformed gas (containing hydrogen), and an adsorption/separation apparatus that removes by adsorption unnecessary components contained in the reformed gas to lead out a hydrogen-rich gas. Also, known methods of reformation adoptable in the reforming reactor of the hydrogen production system include a steam reforming process and a partial oxidation reforming process.

By the steam reforming process, hydrogen is generated from the hydrocarbon-based material and water through a steam reforming reaction, which is an endothermic reaction. For example, the steam reforming reaction of methanol can be expressed by the following thermochemical equation (1).

$$CH_3OH + H_2O = 3H_2 + CO_2 - 49.5 \text{ kJ} \tag{1}$$

Since the steam reforming reaction is an endothermic reaction, the reforming reactor, to which the mixed material containing the hydrocarbon-based material and water is continuously supplied, has to be continuously heated in order to properly carry out the steam reforming reaction, when the steam reforming process is exclusively employed as the reforming method in the reforming reactor of the hydrogen production system. Besides, in the practical operation of the hydrogen production system based on the steam reformation, inside of the reforming reactor has to be preheated to a desired temperature when starting up the system (before supplying the mixed material to the reforming reactor) and the mixed material has to be heated to turn into high temperature vapor before being supplied to the reforming reactor, so that the reforming reaction of the mixed material supplied to the reforming reactor immediately takes place. Such hydrogen production system based on the steam reformation is disclosed, for example, in patent document 1 cited below. The hydrogen production system according to the patent document 1 utilizes combustion heat obtained by burning a fuel continuously supplied separately from outside the system (city gas) to keep heating the inside of the reforming reactor and the mixed material to be supplied thereto. However, the system that requires continuously burning the external fuel to keep heating the inside of the reforming reactor and the mixed material is inefficient and prone to incur an increase in hydrogen producing cost. Moreover, the hydrogen production system including the mechanism for burning the external fuel to keep heating the inside of the reforming reactor and the mixed material external fuel often overgrows in overall scale, which is undesirable.

Patent document 1: JP-A-H09-309703

By the partial oxidation reforming process, hydrogen is generated from the hydrocarbon-based material through a partial oxidation reaction, which is an exothermic reaction. For example, the partial oxidation reaction of methanol can be expressed by the following thermochemical equation (2).

$$CH_3OH + \tfrac{1}{2}O_2 = 2H_2 + CO_2 + 192.5 \text{ kJ} \tag{2}$$

Since the partial oxidation reaction is an exothermic reaction (not an endothermic reaction), the inside of the reforming reactor does not have to be continuously heated when carrying out the reforming reaction, when the partial oxidation reforming process is exclusively employed as the reforming method in the reforming reactor of the hydrogen production system. However, the partial oxidation reaction only offers considerably lower hydrogen generation efficiency than the steam reforming reaction. Accordingly, the hydrogen production system based on the partial oxidation reaction is undesirable from the viewpoint of the hydrogen production efficiency. Besides, since the partial oxidation reaction is an exothermic reaction, the hydrogen production system based on the partial oxidation reaction has to be equipped with a heat-removal mechanism that continuously removes heat from the inside of the hydrogen production system based on the partial oxidation reaction to maintain an appropriate reaction temperature in the hydrogen production system based on the partial oxidation reaction. The hydrogen production system based on the partial oxidation reaction which requires such heat-removal mechanism for the reforming reaction often overgrows in overall scale, which is undesirable.

DISCLOSURE OF THE INVENTION

The present invention has been proposed under the foregoing situation, with an object to provide a thermally independent hydrogen production system that can efficiently produce hydrogen, and a reforming apparatus appropriate to constitute a part of such hydrogen production system.

A first aspect of the present invention provides a hydrogen production system. The hydrogen production system includes a vaporizer that heats a mixed material containing a hydrocarbon-based material, water and oxygen thereby vaporizing the mixed material, a reforming reactor that causes a steam reforming reaction of the hydrocarbon-based material and a partial oxidation reaction of the hydrocarbon-based material at a time thereby generating reformed gas containing hydrogen out of the vaporized mixed material, and a pressure-swing adsorption gas separation apparatus (PSA separation apparatus) that executes a pressure-swing adsorption gas separation process (PSA separation process) in an adsorption tower loaded with an adsorbing agent, to introduce the reformed gas into the adsorption tower to cause the adsorbing agent to adsorb to an unnecessary component in the reformed gas thereby leading out hydrogen-rich gas from the adsorption tower, and to desorb the unnecessary component from the adsorbing agent thereby discharging hydrogen-containing desorbed gas containing hydrogen remaining in the adsorption tower and the unnecessary component from the adsorption tower. The vaporizer burns the hydrogen-containing desorbed gas, and heats the mixed material utilizing combustion gas generated through burning the hydrogen-containing desorbed gas as a heat source. In an operation of the hydrogen production system, the mixed material (containing the hydrocarbon-based material, water, and oxygen) is supplied to the vaporizer, in which the mixed material is heated thus to be vaporized. To the reforming reactor, the mixed material vaporized through the vaporizer is supplied, so that the reformed gas (containing hydrogen) is generated from the mixed material in the reforming reactor. The reformed gas is supplied to the PSA separation apparatus, so that the PSA separation apparatus executes the PSA separation process to extract the hydrogen-rich gas and the hydrogen-containing desorbed gas from the reformed gas. The hydrogen-rich gas is, for example, continuously utilized for a predetermined purpose, or stored in a predetermined tank. The hydrogen-containing desorbed gas is supplied to the vaporizer, to be utilized as a fuel for heating the mixed material to vaporize the same.

Preferably, the hydrocarbon-based material employed in the hydrogen production system is methanol.

Preferably, the hydrogen production system according to the present invention further includes a heater that heats the hydrocarbon-based material and the water to be supplied to the vaporizer, utilizing the reformed gas as a heat source.

Preferably, the vaporizer includes a catalyst combustion unit that executes catalytic combustion of the hydrogen-containing desorbed gas.

Preferably, the vaporizer includes a heat storage unit that stores therein thermal energy possessed by the combustion gas.

In a preferred embodiment, the vaporizer includes a main container, a flow tube that allows the mixed material to flow therein, installed through inside the main container, and a catalyst combustion unit that executes catalytic combustion of the hydrogen-containing desorbed gas to supply combustion gas to the main container.

Preferably, the vaporizer further includes a heat storage material that stores therein the combustion gas thermal energy possessed by the combustion gas, loaded in the main container. In this case, it is preferable that the heat storage material is a ceramic ball.

Preferably, the flow tube is of a spiral shape.

Preferably, the hydrogen production system further includes a heater that heats the reforming reactor utilizing the combustion gas as a heat source.

Preferably, the reforming reactor includes a first region on an upstream side and a second region on a downstream side, such that the first region and the second region are located adjacent to each other via a heat conductive partition wall.

A second aspect of the present invention provides a reforming apparatus that reforms a hydrocarbon-based material thereby generating reformed gas. The reforming apparatus includes a vaporizer that heats a mixed material containing the hydrocarbon-based material, water and oxygen thereby vaporizing the mixed material, utilizing combustion gas generated upon burning a fuel as a heat source, and a reforming reactor that causes a steam reforming reaction of the hydrocarbon-based material and a partial oxidation reaction of the hydrocarbon-based material at a time thereby generating the reformed gas containing hydrogen out of the vaporized mixed material. In this case, it is preferable that the reforming reactor includes a first region on an upstream side and a second region on a downstream side, such that the first region and the second region are located adjacent to each other via a heat conductive partition wall. Preferably, in the reforming apparatus, the fuel includes a portion of the hydrogen in the reformed gas.

A third aspect of the present invention provides a reforming apparatus that reforms a hydrocarbon-based material thereby generating reformed gas. The reforming apparatus includes a reforming reactor that causes, from a vaporized mixed material containing the hydrocarbon-based material, water and oxygen, a steam reforming reaction of the hydrocarbon-based material and a partial oxidation reaction of the hydrocarbon-based material at a time with a same catalyst, thereby generating the reformed gas containing hydrogen out of the vaporized mixed material. The reforming reactor includes a first region on an upstream side and a second region on a downstream side, such that the first region and the second region are located adjacent to each other via a heat conductive partition wall. In this case, it is preferable that the partition wall includes at least one tube.

BEST MODE FOR CARRYING OUT THE INVENTION

Figure 1:
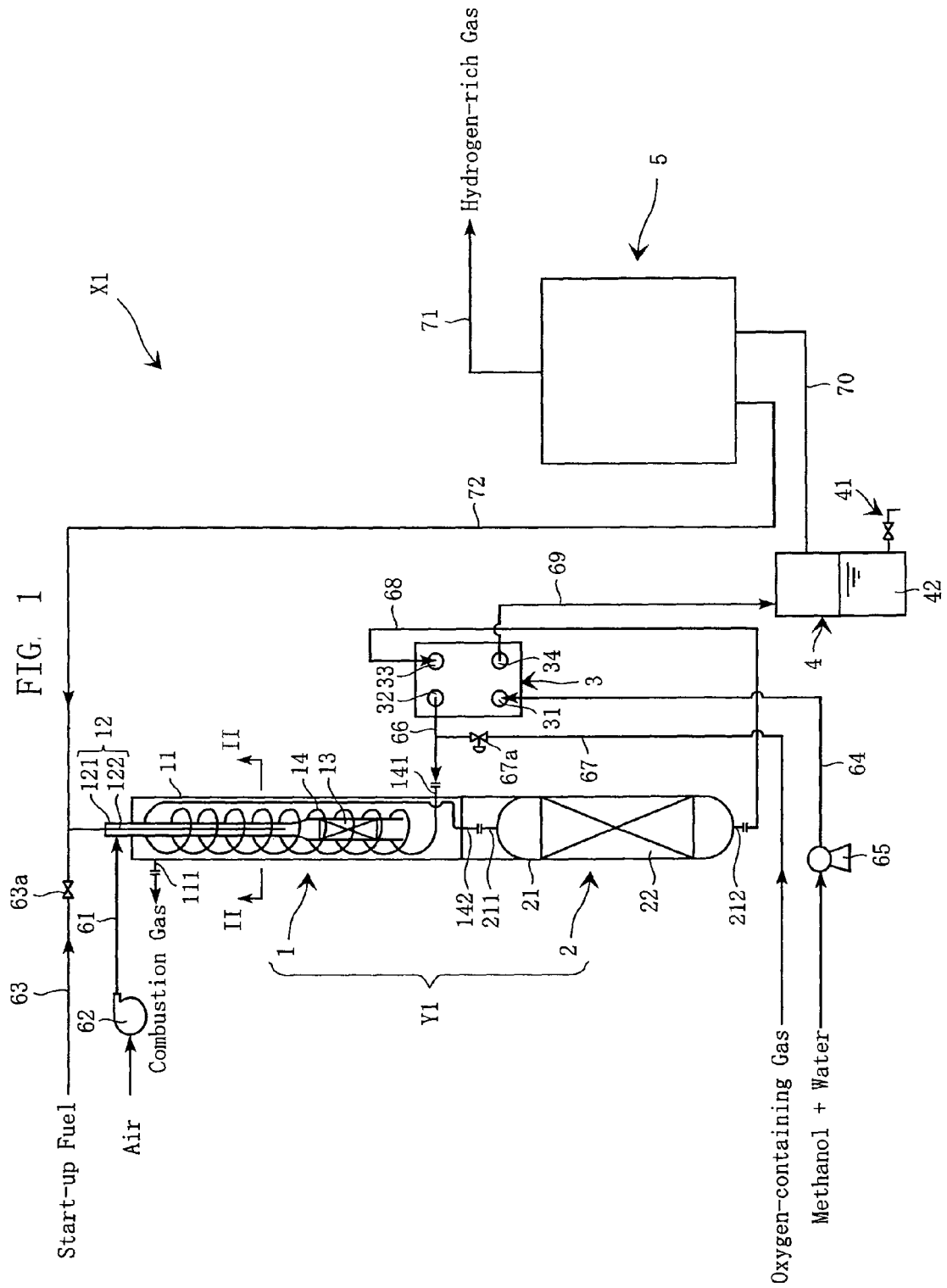
FIG. 1 is a schematic diagram showing an overall configuration of a hydrogen production system according to a first embodiment of the present invention.
Figure 2:
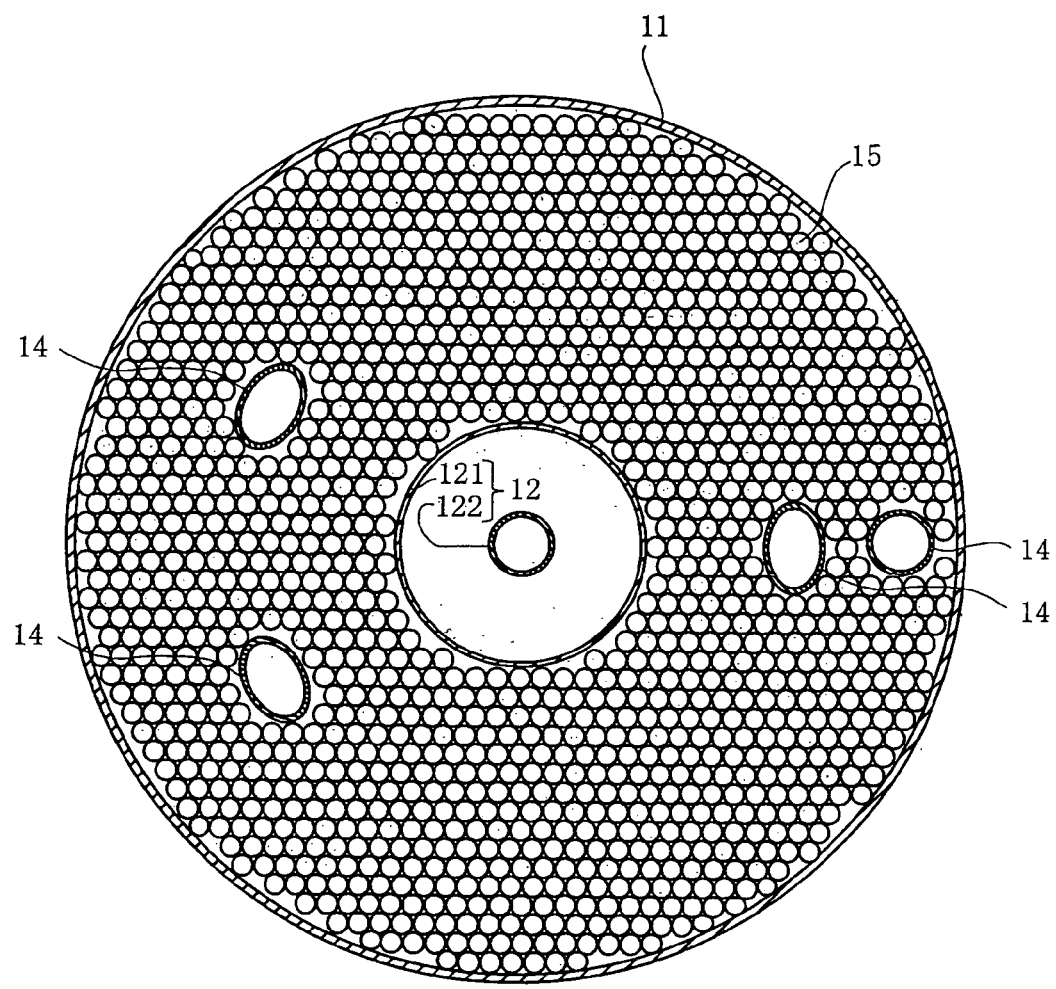
FIG. 2 is an enlarged cross-sectional view of a vaporizer shown in FIG. 1, taken along the line II-II in FIG. 1.

FIGS. 1 and 2 illustrate a hydrogen production system X1 according to a first embodiment of the present invention. FIG. 1 shows an overall configuration of the hydrogen production system X1. FIG. 2 is a cross-sectional view taken along the line II-II in FIG. 1.

The hydrogen production system X1 includes a reforming apparatus Y1 in which a vaporizer 1 and a reforming reactor 2 are vertically connected, a heat exchanger 3, a gas-liquid separator 4, and a pressure-swing adsorption gas separation apparatus (PSA separation apparatus) 5, and is designed for production of hydrogen primarily from methanol, which is a hydrocarbon-based material.

The vaporizer 1 of the reforming apparatus Y1 includes a main container 11, a supply tube 12, a catalyst combustion unit 13, a flow tube 14, and a heat storage material 15 (Ref. FIG. 2), and serves to heat a mixed material containing methanol, water and oxygen thereby vaporizing the mixed material. Here, FIG. 1 partially includes a cross-sectional view but does not include the heat storage material 15, for explicitly showing an inner structure of the vaporizer 1.

The main container 11 is of a tubular shape with closed ends, and includes a combustion gas discharge port 111 at an upper end portion. Suitable materials of the main container 11 include a stainless steel.

The supply tube 12 has a double-tube structure including an outer tube 121 and an inner tube 122. The outer tube 121 has its upper end portion connected to a piping 61 outside the main container 11, with its lower end portion open inside the main container 11. The inner tube 122 has its upper end portion connected to a piping 63 and a piping 72 outside the main container 11, with its lower end portion open inside the outer tube 121. The piping 61 connected to the outer tube 121 is also connected to an air blower 62. The piping 63 connected to the inner tube 122 is connected to a supply source (not shown) of a vaporizing fuel (such as LPG) used when starting up the system, and the piping 63 includes an automatic valve 63a.

The catalyst combustion unit 13 is located at an inner lower end portion of the outer tube 121 in the supply tube 12, and serves to cause catalytic combustion of hydrogen and the start-up fuel thereby generating high temperature combustion gas. The catalyst combustion unit 13 includes a combustion catalyst loaded therein. Examples of the combustion catalyst include platinum-family catalysts such as platinum and palladium.

The flow tube 14 includes a material inlet terminal 141 and a material outlet terminal 142, and is partially of a spiral shape surrounding the supply tube 12. The material inlet terminal 141 and the material outlet terminal 142 are respectively led out of the main container 11 through a lower end portion of the main container 11. Suitable materials of the flow tube 14 include a stainless steel.

The heat storage material 15 is, as shown in FIG. 2, loaded around the supply tube 12 and the flow tube 14, inside the main container 11. Here, inside the main container 11, a gap for the combustion gas generated in the catalyst combustion unit 13 to pass through is secured between the supply tube 12 and the heat storage material 15, as well as between the flow tube 14 and the heat storage material 15. It is preferable that the heat storage material 15 has larger thermal capacitance than the main container 11 and the flow tube 14, and is of a generally spherical shape, such as a ceramic ball.

The reforming reactor 2 of the reforming apparatus Y1 includes, as shown in FIG. 1, a main container 21 and a reforming reaction chamber 22. The reforming reactor 2 serves to cause steam reforming reaction and partial oxidation reaction of methanol at a time, to reform the methanol contained in the mixed material vaporized in the vaporizer 1, thereby generating reformed gas containing hydrogen.

The main container 21 is of a tubular shape with closed ends, and includes a material inlet 211 at an end portion and a reformed gas outlet 212 at the other end portion. The material inlet 211 is connected to the material outlet terminal 142 of the vaporizer 1. Suitable materials of the main container 21 include a stainless steel.

The reforming reaction chamber 22 is provided inside the main container 21, and includes a reforming catalyst (not shown) loaded therein. The reforming catalyst serves to cause steam reforming reaction and partial oxidation reaction at a time, with respect to the methanol contained in the vaporized mixed material. As the reforming catalyst, for example a mixture of aluminum oxide, copper oxide and zinc oxide may be employed. The ratio of those components in the reforming catalyst may be, for example, 42 wt % of CuO, 47 wt % of ZnO, and 10 wt % of $Al_2O_3$.

The heat exchanger 3 includes a methanol water inlet 31, a methanol water outlet 32, a reformed gas inlet 33, and a reformed gas outlet 34, and serves to exchange heat between methanol water yet to be supplied to the vaporizer 1 and the reformed gas generated in the reforming reactor 2, to thereby preheat the methanol water and cool the reformed gas. The heat exchanger 3 includes a path for the methanol water to flow from the methanol water inlet 31 to the methanol water outlet 32, and a path for the reformed gas to flow from the reformed gas inlet 33 to the reformed gas outlet 34, such that the heat exchange can be performed between these two paths. The heat exchanger 3 thus configured contributes to reduction of the thermal energy required by the vaporizer 1 for heating and vaporizing the mixed material. Besides, since the heat exchanger 3 is capable of removing the heat from (i.e. cooling) the reformed gas, the hydrogen production system X1 does not have to be equipped with an additional cooling apparatus for cooling the reformed gas.

The methanol water inlet 31 is connected to a supply source (not shown) of the methanol water via a piping 64 and a pump 65. The pump 65 serves to deliver the methanol water at a predetermined pressure (for example, 0.9 MPa). The methanol water outlet 32 is connected to the material inlet terminal 141 of the vaporizer 1 via a piping 66. To the piping 66, an end portion of a piping 67 is connected. The piping 67 has the other end portion connected to a supply source (not shown) of oxygen-containing gas (for example, oxygen-rich gas or air). Also, the piping 67 includes a flow rate control valve 67a that controls the flow rate of the oxygen-containing gas. The reformed gas inlet 33 is connected to the reformed gas outlet 212 of the reforming reactor 2 via a piping 68. The reformed gas outlet 34 is connected to the gas-liquid separator 4 to be described below, via a piping 69.

The gas-liquid separator 4 includes a liquid discharge port 41, and serves to separate a liquid component (for example water) 42 mixed in the reformed gas, from that reformed gas. The liquid discharge port 41 serves for the liquid component 42 collected by the gas-liquid separator 4 to be discharged therethrough to outside of the gas-liquid separator 4.

The PSA separation apparatus 5 includes at least one adsorption tower loaded with an adsorbing agent, and is capable of extracting hydrogen-rich gas from the reformed gas through a pressure-swing adsorption gas separation process performed in the adsorption tower. Examples of the adsorbing agent loaded in the adsorption tower include a zeolite-based adsorbing agent, a carbon-based adsorbing agent, and an alumina adsorbing agent, among which the zeolite-based adsorbing agent is preferred. In a single adsorption tower, either one type of adsorbing agent or a plurality of types of adsorbing agents may be loaded. Through the pressure-swing adsorption gas separation process performed in the PSA separation apparatus 5, a cycle including an adsorption process, a desorption process and a restoration process is repeated in each single adsorption tower. In the adsorption process, the reformed gas is introduced into the adsorption tower set at a predetermined high pressure to cause the adsorbing agent to adsorb to unnecessary components in the reformed gas (carbon monoxide, carbon dioxide, unreacted methanol, nitrogen and so on), thereby leading out hydrogen-rich gas from the adsorption tower. In the desorption process, the inside of the adsorption tower is depressurized to desorb the unnecessary components from the adsorbing agent, and the unnecessary components are discharged to outside of the tower. In the restoration process, for example a cleaning gas is provided through the tower to recover the adsorbing capability of the adsorbing agent, thus setting the adsorption tower prepared for the subsequent adsorption process. To constitute such PSA separation apparatus 5, a known PSA hydrogen separation apparatus may be employed.

Hereunder, an operation of the hydrogen production system X1 thus configured will be described.

During the operation of the hydrogen production system X1, the pump 65 is activated to introduce the methanol water of a predetermined concentration through the methanol water inlet 31 into the heat exchanger 3, via the piping 64. In the heat exchanger 3, the methanol water of a relatively low temperature (for example, 10 to 25° C.) is heated (preheated) to 137° C. for example, through heat exchange with the reformed gas of a relatively high temperature (for example, 230 to 270° C.) introduced as described later into the heat exchanger 3. The methanol water preheated in the heat exchanger 3 is led out of the heat exchanger 3 through the methanol water outlet 32, and mixed when passing through the piping 66 with the oxygen-containing gas (for example, oxygen-rich gas or air) introduced into the piping 66 through the piping 67. The supply amount of the oxygen-containing gas can be adjusted by the flow rate control valve 67a.

The mixed material thus prepared (containing methanol, water, and oxygen) is introduced into the flow tube 14 of the vaporizer 1, through the material inlet terminal 141. The mixed material introduced into the flow tube 14 is heated, while passing through the flow tube 14, to a desired reaction temperature (for example, 230 to 270° C.) required for the subsequent reforming reaction in the reforming reactor 2, by the heat of combustion gas generated as described later in the catalyst combustion unit 13, thereby being vaporized. The vaporized mixed material is led out of the vaporizer 1 through the material outlet terminal 142 of the flow tube 14, to be supplied to the reforming reactor 2 through the material inlet 211.

The mixed material supplied to the reforming reactor 2 is introduced into the reforming reaction chamber 22. In the reforming reaction chamber 22, the reforming catalyst provokes both of the steam reforming reaction of the methanol, which is an endothermic reaction, and the partial oxidation reaction thereof, which is an exothermic reaction, to generate the reformed gas containing hydrogen, from the mixed material. In this embodiment, the proportion of the methanol consumed in the respective reaction (i.e. the ratio of each reaction) is determined such that the reaction temperature (for example, 230 to 270° C.) is generally constantly maintained in the reforming reaction chamber 22. In other words, autothermal reforming reaction of the methanol takes place in the reforming reaction chamber 22.

Whereas the steam reforming reaction and the partial oxidation reaction of methanol can be expressed as the foregoing chemical formulas (1) and (2), the heat adsorption ($Q_1$) per methanol consumption of 1 mol in the steam reforming reaction is 49.5 kJ, and the calorific value ($Q_2$) per methanol consumption of 1 mol in the partial oxidation reaction is 192.5 kJ. In this embodiment, the ratio of the steam reforming reaction and the partial oxidation reaction is adjusted such that a sum of $Q_1$ and heat loss ($Q_3$) to outside of the reforming reaction chamber 22 becomes equal to $Q_2$, by which the inside of the reforming reaction chamber 22 is maintained at the desired reaction temperature. The ratio of the steam reforming reaction and the partial oxidation reaction may be adjusted by controlling, for example, the composition of the mixed material supplied to the reforming reactor 2 and the reforming reaction chamber 22. For example, in the case of $Q_3=0$, the ratio of the steam reforming reaction and that of the partial oxidation reaction can be obtained by the formula given below, where x represents the former and 1-x the latter. Thus, in the case of $Q_3=0$, it can be theoretically concluded that the ratio x of the steam reforming reaction is approx. 0.80, and the ratio 1-x of the partial oxidation reaction is approx. 0.20.

$$192.5(1-X)-49.5X=0$$

The reformed gas generated in the reforming reaction chamber 22 is led out of the reforming reactor 2 through the reformed gas outlet 212, and introduced into the heat exchanger 3 through the piping 68 and the reformed gas inlet 33. In the heat exchanger 3, the reformed gas of the relatively high temperature (for example, 230 to 270° C.) is cooled to 40° C. for example, through heat exchange with the methanol water of the relatively low temperature (for example, 10 to 25° C.) introduced into the heat exchanger 3 as described above. The reformed gas cooled in the heat exchanger 3 is led out of the heat exchanger 3 through the reformed gas outlet 34, to be introduced into the gas-liquid separator 4 through the piping 69.

The reformed gas introduced into the gas-liquid separator 4 is subjected to gas-liquid separation so that the liquid component 42 mixed in the reformed gas is separated therefrom. This prevents the liquid component 42 from being introduced into the adsorption tower of the PSA separation apparatus 5 located on a downstream side of the gas-liquid separator 4. Such arrangement prevents the adsorbing agent loaded in the adsorption tower from contacting the liquid component 42, thereby preventing the deterioration of the adsorbing agent. The liquid component 42 collected through the gas-liquid separation is discharged out of the gas-liquid separator 4 through the liquid discharge port 41. The reformed gas, upon thus passing through the gas-liquid separator 4, is supplied to the PSA separation apparatus 5 through the piping 70.

In the PSA separation apparatus 5, the pressure-swing adsorption gas separation process is executed to repeat a cycle including an adsorption process, a desorption process and a restoration process, in each single adsorption tower.

In the adsorption process, the reformed gas containing hydrogen is introduced into the adsorption tower set at a predetermined high pressure. In the adsorption tower, unnecessary components (carbon monoxide, carbon dioxide, unreacted methanol, nitrogen and so on) contained in the reformed gas are adsorbed and removed by the adsorbing agent, so that hydrogen-rich gas (gas with high hydrogen concentration) is led out from the adsorption tower, as product gas. The hydrogen-rich gas is taken out of the hydrogen production system X1 through the piping 71. In the desorption process, the inside of the adsorption tower is depressurized to desorb the unnecessary components from the adsorbing agent, and hydrogen-containing desorbed gas, which contains hydrogen remaining in the tower and the unnecessary components, is discharged to outside of the tower. The hydrogen-containing desorbed gas is supplied to the vaporizer 1 as the vaporizing fuel, from the adsorption tower through the piping 72. In the restoration process, for example a cleaning gas is provided through the tower to recover the adsorbing capability of the adsorbing agent with respect to the unnecessary components. Thus, from the PSA separation apparatus 5, the hydrogen-rich gas (product gas), as well as the hydrogen-containing desorbed gas are led out. The hydrogen-rich gas may be either continuously used for a predetermined purpose, or stored in a predetermined tank.

The hydrogen-containing desorbed gas supplied to the vaporizer 1 as the vaporizing fuel is introduced into the catalyst combustion unit 13 through the inner tube 122 and the outer tube 121. At the same time, air is continuously supplied to the catalyst combustion unit 13. Specifically, by activation of the air blower 62, air is continuously supplied to the catalyst combustion unit 13 through the inner tube 122 and the outer tube 121. In the catalyst combustion unit 13 thus configured, the combustion catalyst causes catalytic combustion of the hydrogen in the hydrogen-containing desorbed gas, thereby generating combustion gas of a high temperature (for example, 500 to 600° C.). The catalytic combustion can be maintained over a relatively wide combustion temperature range, and hence can stably continue despite certain fluctuation in hydrogen concentration in the hydrogen-containing desorbed gas. Also, since the catalytic combustion barely generates gas from incomplete combustion, finally emitting the combustion gas generated in the vaporizer 1 into the atmosphere exerts little impact on the environment.

The combustion gas of a high temperature generated in the catalyst combustion unit 13 is discharged from the open end of the outer tube 121 (lower end in FIG. 1) of the supply tube 12, and passes through the region in the main container 11 where the heat storage material 15 is loaded, to be emitted out of the vaporizer 1 through the combustion gas discharge port 111. When the combustion gas pass through the region where the heat storage material 15 is loaded, thermal energy is transmitted from the combustion gas, now acting as the heat source, to the flow tube 14, so that the mixed material flowing through the flow tube 14 is heated to the predetermined temperature (for example, 230 to 270° C.), thus to be vaporized. Since the flow tube 14 is of a spiral shape, a sufficiently large surface area of the flow tube 14 (heat-receiving area) can be secured. Therefore, such flow tube 14 of a spiral shape provides higher heat conduction efficiency with respect to the mixed material flowing therethrough, thereby contributing to achieving higher heating efficiency of the mixed material.

Now, when the temperature of the combustion gas is higher than that of the heat storage material 15, the thermal energy of the combustion gas is also transmitted to the heat storage material 15 thus to be stored therein, while when the temperature of the combustion gas is lower than that of the heat storage material 15, the heat storage material 15 can act as the heat source to thereby heat the combustion gas. Accordingly, the heat storage material 15 can suppress the fluctuation in temperature of the combustion gas serving as the heat source to heat the mixed material, so that the combustion gas can properly heat and vaporize the mixed material. Besides, since the combustion gas flows through narrow gaps formed in the heat storage material 15 in the main container 11, the combustion gas flows faster than in the case where the heat storage material 15 is not loaded. The heat storage material 15 contributes, therefore, to improvement of the heat conduction efficiency from the combustion gas to the mixed material, thus increasing the heating efficiency of the mixed material.

As described above, in a normal operation of the hydrogen production system X1, the material sequentially passes through the heat exchanger 3, the vaporizer 1, the reforming reactor 2, the heat exchanger 3, the gas-liquid separator 4, and the PSA separation apparatus 5, so that the hydrogen-rich gas is led out from the PSA separation apparatus 5, and the hydrogen-containing desorbed gas led out from the PSA separation apparatus 5 is supplied to the vaporizer 1.

Here, the foregoing practical operation of the hydrogen production system X1 represents the normal operation in which the hydrogen-containing desorbed gas is sufficiently supplied from the PSA separation apparatus 5 to the catalyst combustion unit 13. However, when starting up the system for example, the hydrogen-containing desorbed gas is not sufficiently supplied from the PSA separation apparatus 5 to the catalyst combustion unit 13. In such a case, the automatic valve 63a may be kept open until, for example, the hydrogen-containing desorbed gas starts to be sufficiently supplied from the PSA separation apparatus 5 to the catalyst combustion unit 13, so that a vaporizing fuel required by the catalyst combustion unit 13 (for example, LPG) is auxiliarily supplied to the vaporizer 1 or to the catalyst combustion unit 13 provided therein.

In the hydrogen production system X1, adjusting the supply amount of the hydrogen-containing desorbed gas (amount supplied per unit time) discharged from the PSA separation apparatus 5 and supplied to the vaporizer 1 during the operation enables heating the mixed material in the vaporizer 1 to turn the mixed material into vapor of a desired temperature exclusively with the hydrogen-containing desorbed gas from the PSA separation apparatus, during the normal operation after a predetermined time has elapsed since starting up the system. Also, in the hydrogen production system X1, adjusting the ratio of the steam reforming reaction and the partial oxidation reaction of the hydrocarbon-based material, which take place in the reforming reaction chamber 22 of the reforming reactor 2 during the operation enables maintaining a desired reaction temperature in the reforming reactor. Thus, the hydrogen production system X1 is capable of continuously heating and vaporizing the mixed material exclusively with the self-generated heat available from the system operation, and maintaining the desired temperature in the reforming reaction chamber 22 of the reforming reactor 2, during the normal operation. Such thermally independent hydrogen production system thus configured can efficiently produce hydrogen, unlike the inefficient method and structure of burning an external fuel to continuously heat the mixed material and the inside of the reforming reactor. Such improvement in efficiency is quite beneficial in, for example, reducing the production cost of hydrogen.

Also, the hydrogen production system X1 capable of performing the autothermal reforming reaction under an appropriately controlled thermal energy balance in the reforming reactor 2 as described above eliminates the need to additionally provide a heating mechanism for burning an external fuel thereby heating the inside of the reforming reactor 2 and a heat-removal mechanism for removing heat from the reforming reactor 2, and is hence quite advantageous in suppressing the physical dimensions of the system. Further, since the hydrogen production system X1 adopts both of the partial oxidation reaction and the steam reforming reaction as the reforming method in the reforming reactor 2, higher hydrogen production efficiency can be achieved than in a partial oxidation reaction type hydrogen production system. Still further, since the steam reforming reaction which is an endothermic reaction, and the partial oxidation reaction which is an exothermic reaction both take place in the reforming reactor 2 of the hydrogen production system X1, the inside of the reforming reactor 2 does not has to be preheated to a lowest necessary reaction temperature, unlike in a steam reformation type hydrogen production system. The hydrogen production system X1 can, therefore, be started up in a relatively short period of time.

Figure 3:
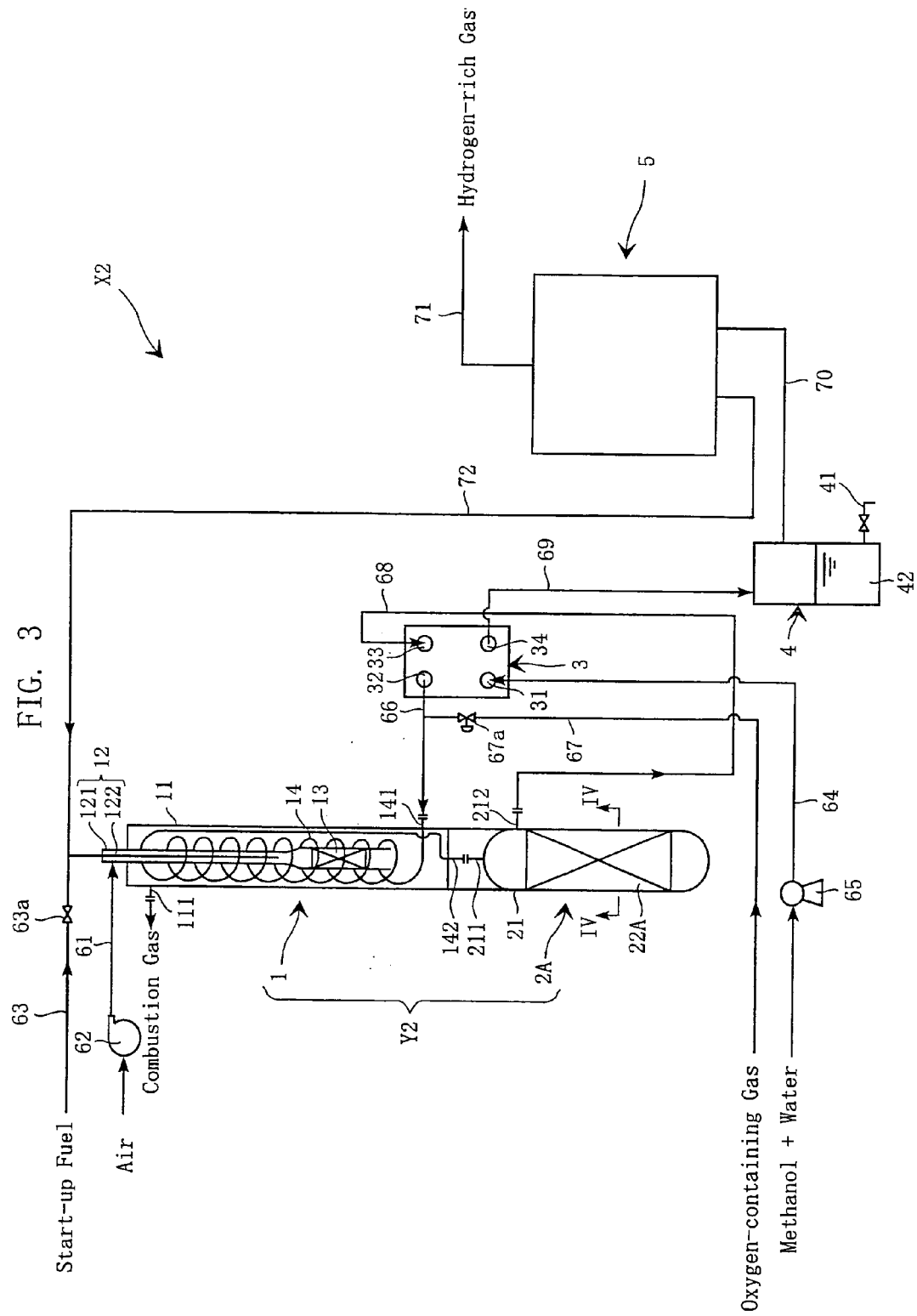
FIG. 3 is a schematic diagram showing an overall configuration of a hydrogen production system according to a second embodiment of the present invention.
Figure 4A:
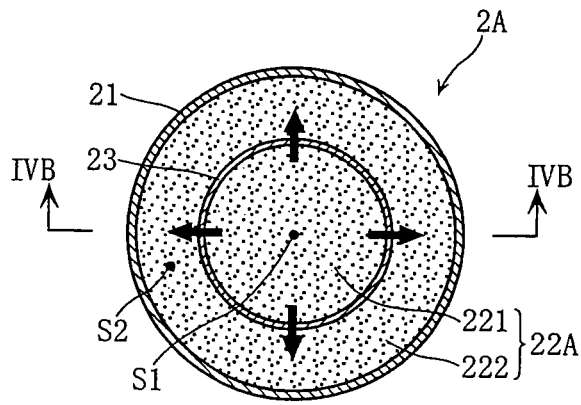
FIG. 4A is a cross-sectional view of a reforming reactor shown in FIG. 3, taken along the line IV-IV.
Figure 4B:
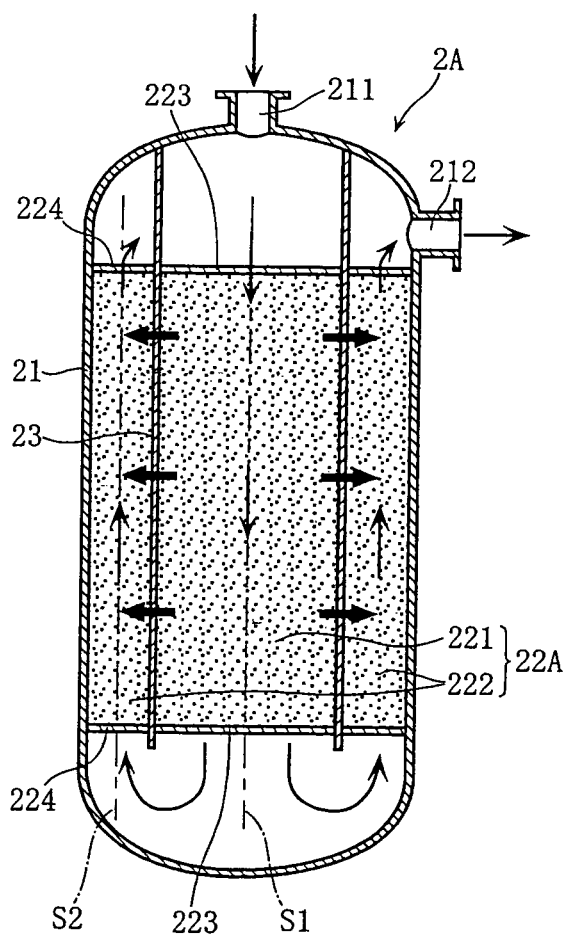
FIG. 4B is a cross-sectional view taken along the line IVB-IVB in FIG. 4A.

FIGS. 3, 4A and 4B illustrate a hydrogen production system X2 according to a second embodiment of the present invention. FIG. 3 is a schematic diagram showing an overall configuration of the hydrogen production system X2. FIG. 4A is a cross-sectional view taken along the line IV-IV in FIG. 3. FIG. 4B is a cross-sectional view taken along the line IVB-IVB in FIG. 4A. In the second embodiment of the present invention, constituents or portions that are the same as or similar to those of the first embodiment of the present invention are given the identical numeral, and description thereof will be omitted where appropriate.

The hydrogen production system X2 includes a reforming apparatus Y2 including a vaporizer 1 and a reforming reactor 2A, a heat exchanger 3, a gas-liquid separator 4, and a PSA separation apparatus 5, and is designed for production of hydrogen primarily from methanol, which is a hydrocarbon-based material.

As shown in FIGS. 4A and 4B, the reforming reactor 2A includes a main container 21, a tubular member 23, and a reforming reaction chamber 22A. The reforming reactor 2A is different from the reforming reactor 2 of the first embodiment in including the tubular member 23 and the reforming reaction chamber 22A in place of the reforming reaction chamber 22, and various design modifications incidental thereto.

In this embodiment, the main container 21 includes a material inlet 211 at an upper end portion thereof, and a reformed gas outlet 212 on a lateral wall close to the upper end portion.

The tubular member 23 is of a cylindrical shape with a predetermined thickness, and located inside the main container 21 as shown in FIGS. 4A and 4B. The tubular member 23 has its upper end portion fixed to an inner wall of the upper end portion of the main container 21, for example by welding. The upper end portion of the tubular member 23 communicates with the material inlet 211, without defining any gap between the upper end portion of the tubular member 23 and the inner wall of the upper end portion of the main container 21. The lower end portion of the tubular member 23 is open inside the main container 21. Accordingly, inside the main container 21, a passage for gas to flow from the material inlet 211 to the reformed gas outlet 212 is provided through inside of the tubular member 23, a lower portion of the main container 21, and a region between the main container 21 and the tubular member 23. The tubular member 23 is made of a thermally conductive material. Suitable materials of the tubular member 23 include a stainless steel having high heat conductivity.

The reforming reaction chamber 22A, in which a reforming catalyst is loaded, includes a column-shaped first region 221 inside the tubular member 23, and a cylindrical second region 222 located adjacent to the first region 221 via the tubular member 23 (between the main container 21 and the tubular member 23). The first region 221 is delimited by the tubular member 23 and a pair of partitions 223 vertically spaced inside the tubular member 23. The second region 222 is delimited by the main container 21, the tubular member 23, and a pair of partitions 224 vertically spaced between the main container 21 and the tubular member 23. Thus, the tubular member 23 serves as the partition wall between the first region 221 and the second region 222 located adjacent to each other. The partitions 223, 224 may be made of a material capable of transmitting the vaporized mixed material and the reformed gas while encapsulating the reforming catalyst, such as a perforated plate.

In a normal operation of the hydrogen production system X2, as in the hydrogen production system X1, the material sequentially passes through the heat exchanger 3, the vaporizer 1, the reforming reactor 2A, the heat exchanger 3, the gas-liquid separator 4, and the PSA separation apparatus 5, so that the hydrogen-rich gas is led out from the PSA separation apparatus 5, and the hydrogen-containing desorbed gas led out from the PSA separation apparatus 5 is supplied to the vaporizer 1.

In the hydrogen production system X2, the vaporized mixed material introduced into the reforming reactor 2A through the material inlet 211 passes through the first region 221, which is the upstream side, inside the tubular member 23 and emitted through the lower end portion of the tubular member 23, to be then led through the second region 222 which is the downstream side, between the main container 21 and the tubular member 23, to the reformed gas outlet 212. Arrows marked in FIG. 4B represent the flowing direction of the gas in the main container 21 (This also applies to FIGS. 5B, 6B and 7B to be described later) In the reforming reaction chamber 22A (the first region 221 and the second region 222), the reforming catalyst provokes the autothermal reforming reaction of methanol, such that the reformed gas containing hydrogen is extracted from the mixed material.

Meanwhile, when the steam reforming reaction and the partial oxidation reaction of methanol take place at a time, the partial oxidation reaction which is an exothermic reaction advances much faster than the steam reforming reaction which is an endothermic reaction. Accordingly, upon introducing the mixed material into the reforming reaction chamber, the partial oxidation reaction primarily takes place in the upstream side of the reforming reaction chamber thereby raising the temperature, while the steam reforming reaction primarily takes place in the downstream side of the reforming reaction chamber, thereby lowering the temperature. Therefore, although it is the autothermal reforming reaction that takes place in the reforming reaction chamber as a whole, the temperatures of different regions are not uniform. If the temperature becomes lower than the minimum temperature required for the steam reforming reaction in the downstream side of the reforming reaction chamber, the progress of the steam reforming reaction is inhibited and generation of hydrogen is lowered. Also, if the temperature in the upstream side of the reforming reaction chamber becomes excessively high, the activity of the reforming catalyst is disturbed, resulting in decreased generation of hydrogen.

On the other hand, in this embodiment the first region 221 on the upstream side and the second region 222 on the downstream side are adjacently located via the heat conductive tubular member 23, in the reforming reaction chamber 22A. Such structure allows transmitting the thermal energy via the tubular member 23, from the first region 221 where the temperature becomes relatively high to the second region 222 where the temperature becomes relatively low (Solid arrows marked in FIGS. 4A and 4B represent the heat conduction direction via the tubular member 23. This also applies to FIGS. 5B, 6B and 7B to be described later), thereby leveling off the temperature distribution in the respective regions in the reforming reaction chamber 22A. Therefore, a sufficiently high temperature for the steam reforming reaction can be maintained in the entirety of the second region 222 on the downstream side, so that the steam reforming reaction takes place to its fullest extent. Also, in the first region 221 on the upstream side, the heat conduction to the second region 222 prevents the excessive increase in temperature in the first region 221.

Further, since the reforming reaction chamber 22A is divided into the first region 221 and the second region 222 by the tubular member 23, the cross-sectional area of the flow path of the gas (vaporized mixed material and the reformed gas) is smaller than in the case where the tubular member 23 is not provided. Accordingly, the gas flows faster through the reforming reaction chamber 22A than in a structure without the tubular member 23. Such arrangement increases the heat conduction efficiency by the gas flow from the upstream side to the downstream side in the reforming reaction chamber 22A, thereby enhancing the leveling effect of the temperature distribution in the reforming reaction chamber 22A.

Thus, such structure of the reforming reaction chamber 22A as including the first region 221 on the upstream side and the second region 222 on the downstream side adjacently located via the heat conductive tubular member 23 (partition wall) suppresses the fluctuation in temperature distribution in the respective regions in the reforming reaction chamber 22A, originating from the difference in reaction speed between the steam reforming reaction which is an endothermic reaction and the partial oxidation reaction which is an exothermic reaction. The hydrogen production system X2 including the reforming reactor 2A thus configured is capable of properly performing the steam reforming reaction and the partial oxidation reaction, and is hence beneficial in increasing the generation efficiency of hydrogen.

FIGS. 5A to 7B illustrate variations of the reforming reactor according to this embodiment.

Figure 5A:
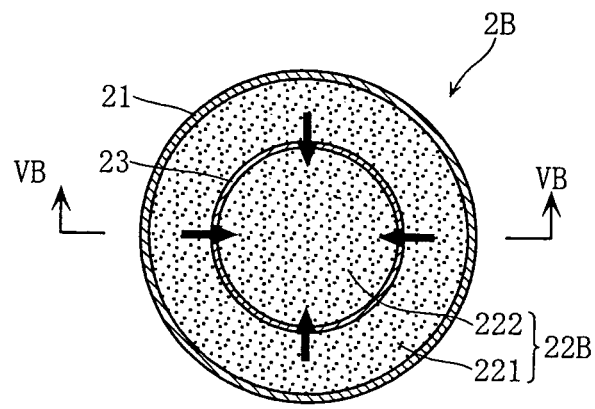
FIG. 5A is a cross-sectional view of another example of the reforming reactor, similarly taken to FIG. 4A.
Figure 5B:
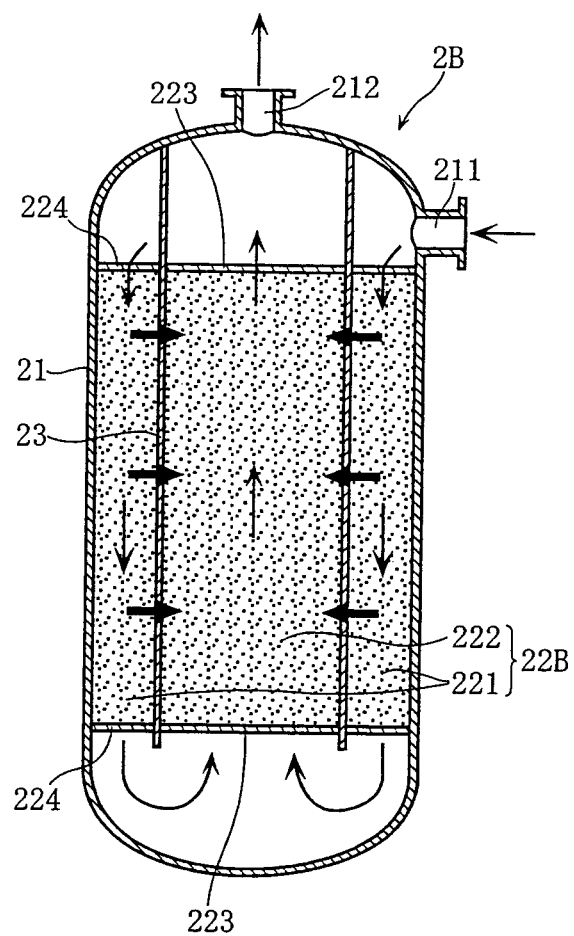
FIG. 5B is a cross-sectional view taken along the line VB-VB in FIG. 5A.

In the reforming reactor 2B shown in FIGS. 5A and 5B, the material inlet 211 is located on the lateral wall of the main container 21 at a position close to the upper end portion, while the reformed gas outlet 212 is located at the upper end portion of the main container 21. In the reforming reaction chamber 22B of the reforming reactor 2B, the region between the main container 21 and the tubular member 23 corresponds to the first region 221 on the upstream side, and the inside of the tubular member 23 corresponds to the second region 222 on the downstream side. In other words, the reforming reactor 2B is different from the reforming reactor 2A shown in FIGS. 4A and 4B, in that the first region 221 and the second region 222 are reversely located.

Figure 6A:
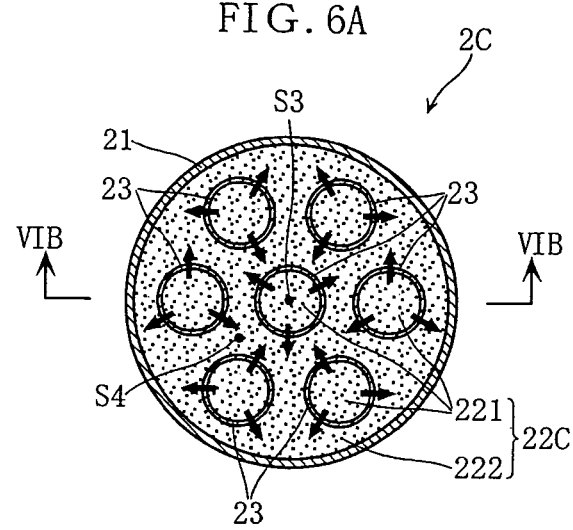
FIG. 6A is a cross-sectional view of another example of the reforming reactor, similarly taken to FIG. 4A.
Figure 6B:
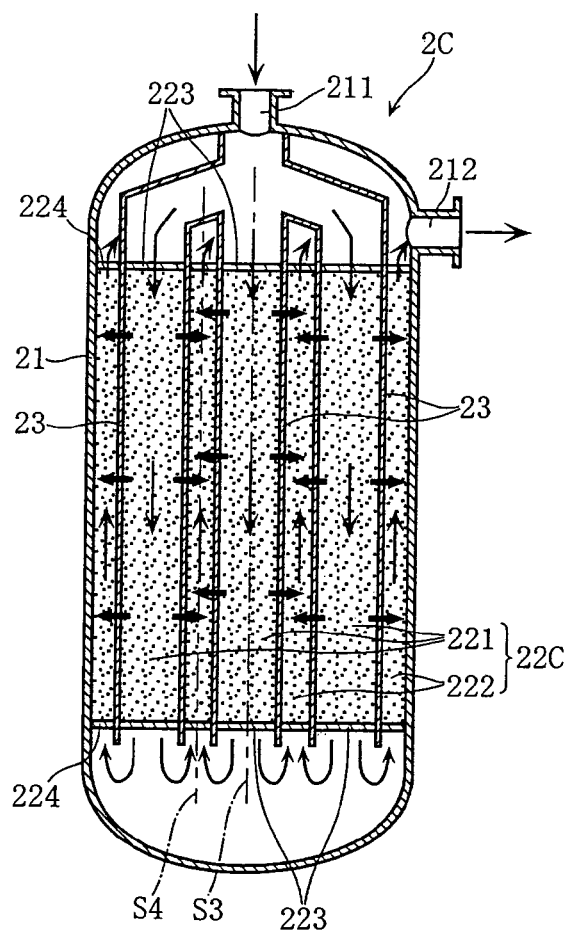
FIG. 6B is a cross-sectional view taken along the line VIB-VIB in FIG. 6A.

The reforming reactor 2C shown in FIGS. 6A and 6B includes a plurality (seven pieces) of tubular members 23 communicating with the material inlet 211, instead of the single tubular member 23 of the first embodiment. In the reforming reaction chamber 22C of the reforming reactor 2C, the inside of the tubular members 23 corresponds to the first region 221 on the upstream side, and the region between the main container 21 and the tubular member 23 corresponds to the second region 222 on the downstream side. Thus, in the reforming reaction chamber 22C the first region 221 on the upstream side is dispersedly located inside the plurality of tubular members 23. Such configuration increases the heat-receiving area of the tubular member 23 acting as the heat conducting member. Therefore, during the steam reforming reaction and the partial oxidation reaction the heat conduction efficiency from the first region 221 to the second region 222 via the tubular member 23 is increased, by which the temperature distribution in the reforming reaction chamber 22C is more properly leveled off. This also contributes to increased efficiency of the steam reforming reaction and the partial oxidation reaction, hence increased generation efficiency of hydrogen.

Figure 7A:
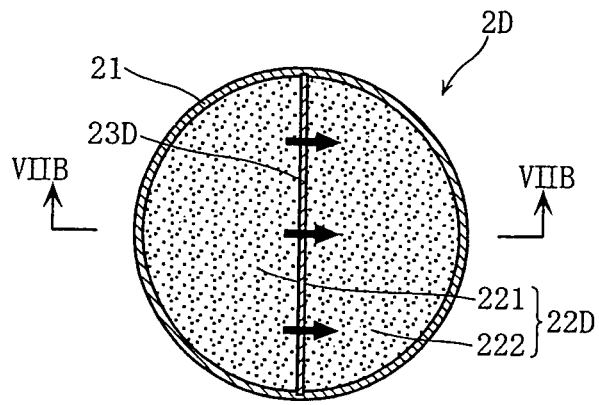
FIG. 7A is a cross-sectional view of another example of the reforming reactor, similarly taken to FIG. 4A.
Figure 7B:
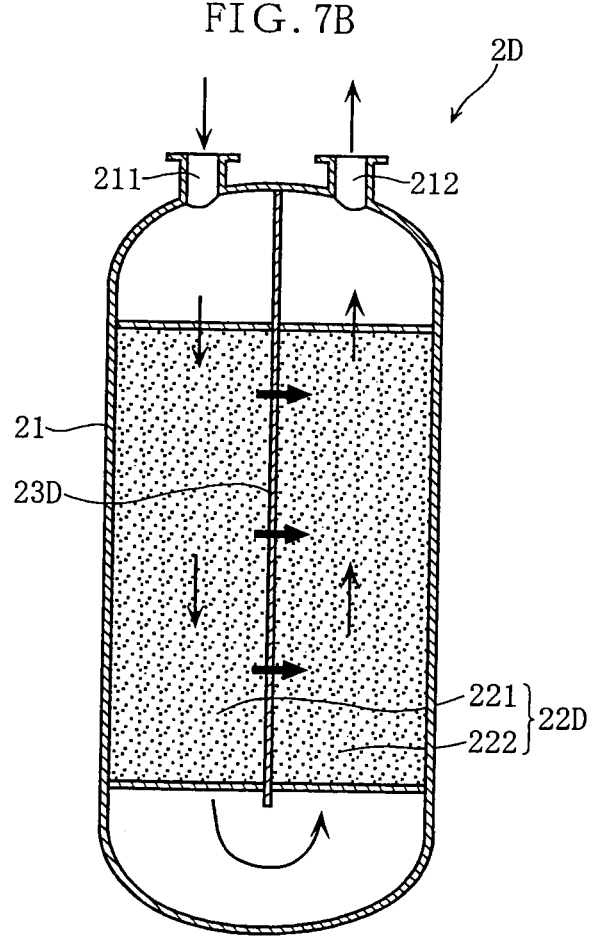
FIG. 7B is a cross-sectional view taken along the line VIIB-VIIB in FIG. 7A.

The reforming reactor 2D shown in FIGS. 7A and 7B includes a plate-shaped partition wall 23D instead of the tubular member 23. The material inlet 211 is located on the left side of the upper end portion of the main container 21, and the reformed gas outlet 212 on the right side of the upper end portion of the main container 21, according to FIG. 7B. The partition wall 23D is fixed to an inner wall of the main container 21, to define a predetermined clearance from the lower end portion. In the reforming reaction chamber 22D of the reforming reactor 2D, the region on the left of the partition wall 23D according to FIG. 7B corresponds to the first region 221 on the upstream side, and the region on the right of the partition wall 23D according to FIG. 7B corresponds to the second region 222 on the downstream side.

Figure 8:
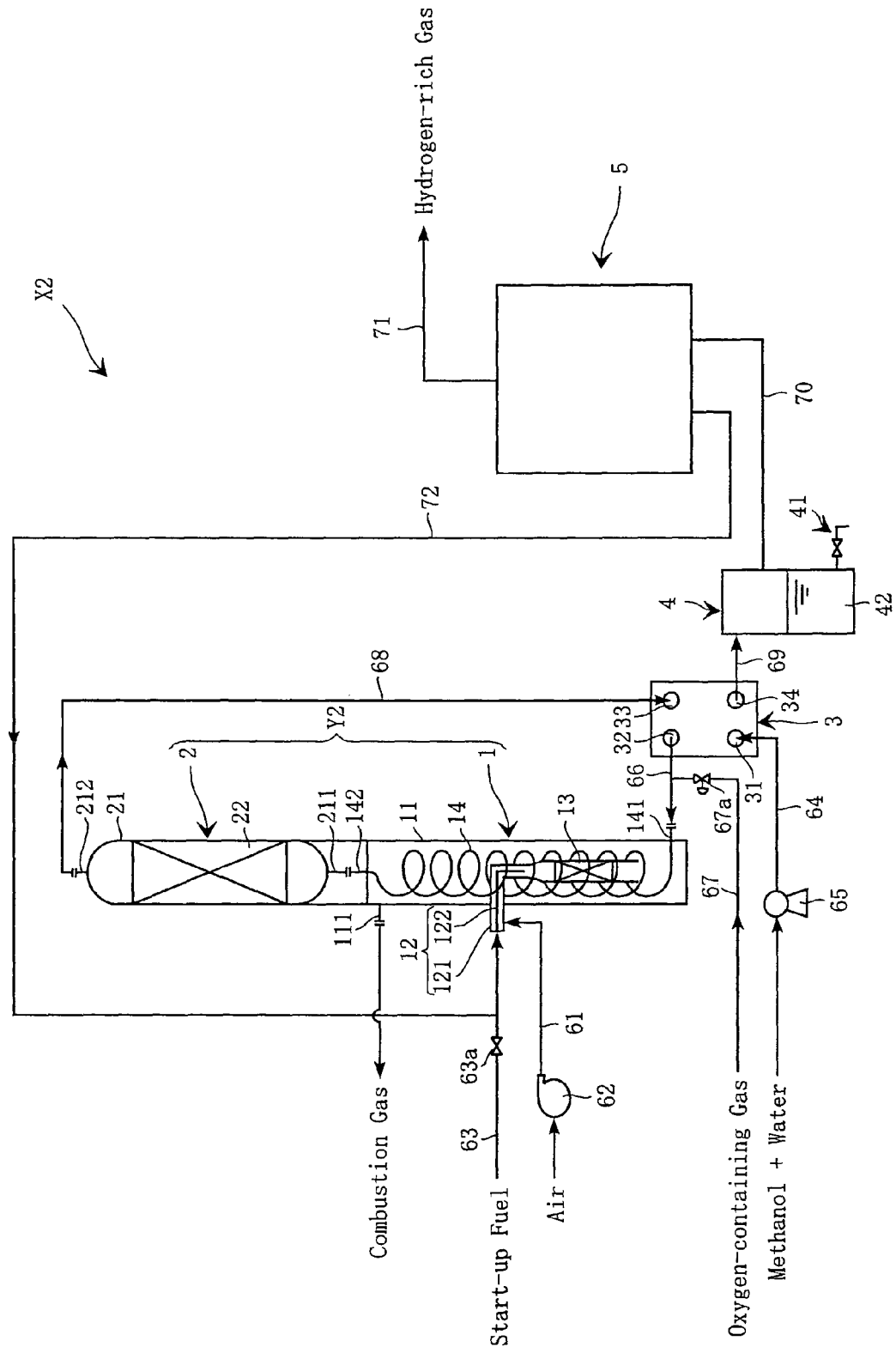
FIG. 8 is a schematic diagram showing an overall configuration of a hydrogen production system according to a third embodiment of the present invention.

FIG. 8 is a schematic diagram showing an overall configuration of a hydrogen production system X3 according to a third embodiment of the present invention. In the third embodiment of the present invention, constituents or portions that are the same as or similar to those of the first embodiment of the present invention are given the identical numeral, and description thereof will be omitted where appropriate.

The hydrogen production system X3 includes a reforming apparatus Y3 including a vaporizer 1 and a reforming reactor 2, a heat exchanger 3, a gas-liquid separator 4, and a PSA separation apparatus 5, and is designed for production of hydrogen primarily from methanol, which is a hydrocarbon-based material.

The reforming apparatus Y3 is different from the reforming apparatus Y1 in that the vaporizer 1 and the reforming reactor 2 are vertically reversely located, and that various design modifications incidental to such change are made in the vaporizer 1 and the reforming reactor 2. In this embodiment, the supply tube 12 of the vaporizer 1 is outwardly extended through a lateral wall of the main container 11. The material outlet terminal 142 of the flow tube 14 is extended out of the main container 11 through an upper end portion thereof. The material inlet 211 and the reformed gas outlet 212 of the reforming reactor 2 are located at a lower end portion and an upper end portion of the main container 21, respectively.

In a normal operation of the hydrogen production system X3, as in the hydrogen production system X1, the material sequentially passes through the heat exchanger 3, the vaporizer 1, the reforming reactor 2, the heat exchanger 3, the gas-liquid separator 4, and the PSA separation apparatus 5, so that the hydrogen-rich gas is led out from the PSA separation apparatus 5, and the hydrogen-containing desorbed gas led out from the PSA separation apparatus 5 is supplied to the vaporizer 1.

The hydrogen production system X3 includes, as described above, the material inlet 211 located at the lower end portion of the reforming reactor 2, in connection with the material outlet terminal 142 of the vaporizer 1 for receiving the mixed material. Accordingly, even if the mixed material should be insufficiently heated in the vaporizer 1 such that a portion of the mixed material remains unvaporized, the unvaporized mixed material can be kept from contacting the reforming catalyst loaded in the reforming reaction chamber 22 located above the mixed material inlet 211. In the hydrogen production system X3, therefore, the deterioration of the reforming catalyst due to contact with the unvaporized mixed material can be prevented. This is an additional advantage of the hydrogen production system X3, to those described above regarding the hydrogen production system X1.

Figure 9:
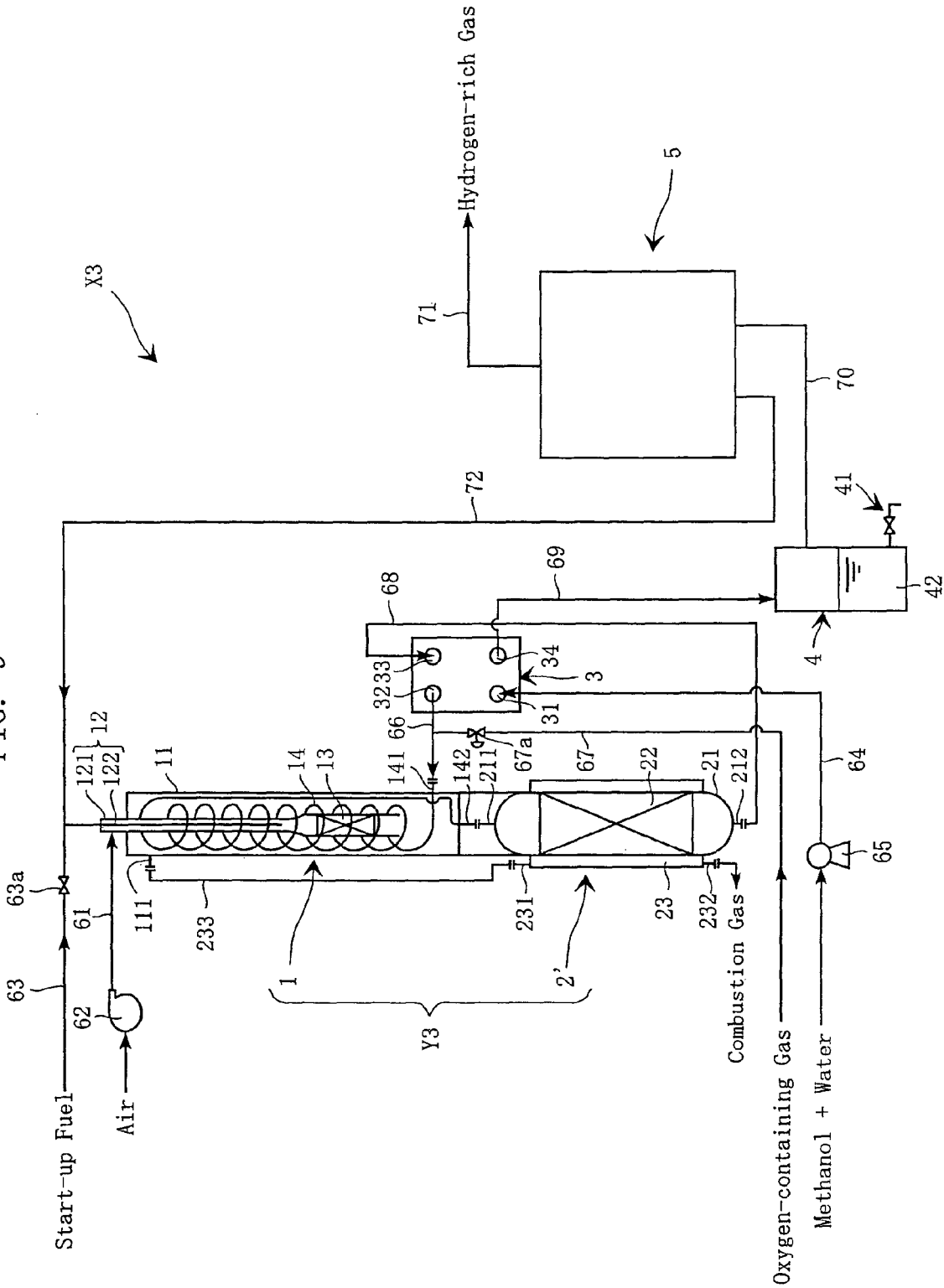
FIG. 9 is a schematic diagram showing an overall configuration of a hydrogen production system according to a fourth embodiment of the present invention.

FIG. 9 is a schematic diagram showing an overall configuration of a hydrogen production system X4 according to a fourth embodiment of the present invention. In the fourth embodiment of the present invention, constituents or portions that are the same as or similar to those of the first embodiment of the present invention are given the identical numeral, and description thereof will be omitted where appropriate.

The hydrogen production system X4 includes a reforming apparatus Y4 including a vaporizer 1 and a reforming reactor 2', a heat exchanger 3, a gas-liquid separator 4, and a PSA separation apparatus 5, and is designed for production of hydrogen primarily from methanol, which is a hydrocarbon-based material. The hydrogen production system X4 is different from the hydrogen production system X1 in including the reforming apparatus Y4 in place of the reforming apparatus Y1, and the reforming apparatus Y4 from the reforming apparatus Y1 in including the reforming reactor 2' instead of the reforming reactor 2.

The reforming reactor 2' includes a main container 21, a reforming reaction chamber 22, and a jacket 24. The jacket 24 includes a combustion gas inlet 241 and a combustion gas discharge port 242, and is disposed to surround an outer periphery of the main container 21 of the reforming reactor 2'. The combustion gas inlet 241 serves to introduce therethrough the combustion gas discharged from the combustion gas discharge port 111 of the vaporizer 1 into the jacket 24, and is connected to the combustion gas discharge port 111 via a piping 243. The combustion gas discharge port 242 serves to outwardly discharge therethrough the combustion gas in the jacket 24.

In a normal operation of the hydrogen production system X4, as in the hydrogen production system X1, the material sequentially passes through the respective sections in the system, so that the hydrogen-rich gas is led out from the PSA separation apparatus 5, and the hydrogen-containing desorbed gas led out from the PSA separation apparatus 5 is supplied to the vaporizer 1.

Also, during the operation of the hydrogen production system X4, the combustion gas of a relatively high temperature (for example, 300° C.) discharged through the combustion gas discharge port 111 of the vaporizer 1 is introduced in the jacket 24 via the piping 243. The combustion gas introduced in the jacket 24 heats the reforming reactor 2'. The combustion gas in the jacket 24 is outwardly discharged through the combustion gas discharge port 242.

In the hydrogen production system X4, utilizing thus the combustion gas as the heat source for heating the reforming reactor 2' allows compensating a loss in thermal energy in the reforming reaction chamber 22 due to heat dissipation from the main container 21 of the reforming reactor 2'. For example, the heat loss ($Q_3$) described regarding the first embodiment can be entirely compensated with the calorific value of the combustion gas introduced in the jacket 24. When the entire heat loss ($Q_3$) is compensated by the calorific value of the combustion gas introduced in the jacket 24, the autothermal reforming reaction in which the thermal energy balance between the heat adsorption by the steam reforming reaction ($Q_1$) and the calorific value from the partial oxidation reaction ($Q_2$) is set to be zero can be properly performed continuously. Also, in the hydrogen production system X4, heat exceeding the heat loss ($Q_3$) may be supplied from the jacket 24 to the reforming reaction chamber 22 in the reforming reactor 2'. In this case, even though the ratio of the steam reforming reaction (value of x in the foregoing passage) in the autothermal reforming reaction is set at a level significantly higher than 0.80, still the autothermal reforming reaction can be properly continued and higher hydrogen generation efficiency can be achieved.

The present invention is not limited to the foregoing embodiments. Specific structure of each constituent of the hydrogen production system and the reforming apparatus according to the present invention may be modified in various manners. For example, the heat storage material employed as heat storage unit may be omitted.

WORKING EXAMPLE 1

The hydrogen production system X1 constructed as follows was employed, to produce hydrogen (hydrogen-rich gas) from a mixed material (containing methanol, water, and oxygen).

<Hydrogen Production System>

In the hydrogen production system of this working example, a stainless steel tube (outer diameter: 216 mm, inner diameter: 208 mm, overall length: 1000 mm) was employed as the main container 11 of the vaporizer 1. As the catalyst combustion unit 13, a predetermined burner loaded with a platinum based catalyst for combustion was employed. As the flow tube 14, a stainless steel tube (inner diameter: 10 mm, overall length: 20 m) partially formed in a spiral shape was employed. As the heat storage material 15, approx. 25 liters of ceramic balls (diameter: 6.35 mm) constituted of a mixture of aluminum oxide and silicon dioxide were loaded in the main container 11 (loading height: 900 mm). The main container 21 of the reforming reactor 2 was made of a stainless steel tube (outer diameter: 165 mm, inner diameter: 158 mm, overall length: 750 mm). Around the main container 21, an adiabatic material for heat insulation was attached. In the reforming reaction chamber 22, approx. 10 liters of pellet type steam reforming catalyst (particle diameter: 3.0 mm) containing aluminum oxide, copper oxide and zinc oxide were loaded (loading height: 500 mm). This catalyst also serves as the catalyst for the partial oxidation reaction. As the heat exchanger 3, a plate type heat exchanger (product name: brazing plate heat exchanger, manufactured by Hisaka Works, Ltd.) was employed. As the PSA separation apparatus 5, a tri-tower PSA hydrogen separation apparatus (product name: PSA hydrogen gas generator, manufactured by Sumitomo Seika Chemicals, Co., Ltd.) was employed. The adsorption towers of this apparatus were of a cylindrical shape of 50 mm in diameter and 1000 mm in overall length, in each of which approx. 1.7 liters of zeolite-based adsorbing agent were loaded (loading height: 900 mm).

<Production of Hydrogen>

For production of hydrogen according to this working example, methanol water (20° C.) having a methanol concentration of 58.7 wt % was introduced into the heat exchanger 3 at a flow rate corresponding to supply of methanol and water at 0.42 kmol/h and 0.525 kmol/h respectively, to the system. In the heat exchanger 3, the methanol water was heated to 137° C. because of heat exchange with the reformed gas from the reforming reactor 2. To the methanol water that passed through the heat exchanger 3, oxygen was added at a flow rate of 0.20 kmol/h. Such mixed material was introduced into the vaporizer 1, in which the mixed material was heated to 250° C., thus being vaporized. The vaporized mixed material was introduced into the reforming reactor 2, and reformed gas containing hydrogen (250° C.) was generated through autothermal reforming reaction (reaction pressure: 0.9 MPa) in the reforming reaction chamber 22. The reformed gas was introduced into the heat exchanger 3, to be cooled to 40° C. through heat exchange with the methanol water. The cooled reformed gas was introduced into the gas-liquid separator 4, so that the liquid component contained in the reformed gas was separated and removed. Thereafter, the reformed gas was introduced into the PSA separation apparatus 5. In the PSA separation apparatus 5, hydrogen-rich gas was extracted from the reformed gas. Also, hydrogen-containing desorbed gas discharged from the PSA separation apparatus 5 was introduced into the catalyst combustion unit 13 of the vaporizer 1, and used as the fuel for heating and vaporizing the mixed material. Through such hydrogen production according to this working example, reaction rate of methanol in the reforming reactor 2 was 97.6%, hydrogen collection rate in the PSA separation apparatus 5 was 80%, and hydrogen purity of the hydrogen-rich gas was 99.999%. Also, the gained quantity of the hydrogen-rich gas of 99.999% in purity was 20.24 Nm$^3$/h.

In this working example, the oxygen supply was set at 0.20 kmol/h with respect to methanol supply of 0.42 kmol/h, so that the partial oxidation reaction covered approx. 20% of the autothermal reforming reaction. Also, because of the adiabatic material attached around the main container 21 of the reforming reactor 2, heat dissipation from the main container 21 was suppressed. Therefore, the thermal energy balance between the heat adsorption ($Q_1$) by the steam reforming reaction and the calorific value ($Q_2$) by the partial oxidation reaction in the reforming reactor 2 was substantially zero, and hence it was not necessary to additionally provide a heater for heating the reforming reactor 2.

Also, in this working example, the total quantity of heat necessary for heating the materials, i.e. the methanol and water, from 20° C. to 250° C. at the flow rate specified above for vaporizing (48000 kJ/h) could be procured from the quantity of heat obtained from the reformed gas in the heat exchanger 3 (15800 kJ/h), and approx. 50% (32200 kJ/h) of the quantity of heat obtained from the catalytic combustion of the hydrogen-containing desorbed gas (64500 kJ/h) discharged from the PSA separation apparatus 5 in the catalyst combustion unit 13. Accordingly, for obtaining the total quantity of heat necessary for heating the materials, i.e. the methanol and water, from 20° C. to 250° C. at the flow rate specified above for vaporizing (48000 kJ/h), it was not necessary to supply a fuel from outside of the system and to keep burning such fuel.

WORKING EXAMPLE 2

The same hydrogen production system X1 as that of the working example 1 was employed to produce hydrogen (hydrogen-rich gas) from a mixed material (containing methanol, water, and oxygen), but in a different material supply mode from the working example 1. Specifically, for production of hydrogen according to this working example, methanol water (20° C.) having a methanol concentration of 58.7 wt % was introduced into the heat exchanger 3 at a flow rate corresponding to supply of methanol and water at 0.45 kmol/h and 0.5625 kmol/h respectively, to the system. To the methanol water that passed through the heat exchanger 3, air was added at a flow rate of 1.02 kmol/h. Other operations were similarly performed to the working example 1.

Through such hydrogen production according to this working example, reaction rate of methanol in the reforming reactor 2 was 97.6%, hydrogen collection rate in the PSA separation apparatus 5 was 75%, and hydrogen purity of the hydrogen-rich gas was 99.9%. Also, the gained quantity of the hydrogen-rich gas of 99.9% in purity was 20.33 Nm³/h.

In this working example, the air supply was set at 1.02 kmol/h with respect to methanol supply of 0.45 kmol/h, so that the partial oxidation reaction covered approx. 20% of the autothermal reforming reaction. Also, because of the adiabatic material attached around the main container 21 of the reforming reactor 2, heat dissipation from the main container 21 was suppressed. Therefore, the thermal energy balance between the heat adsorption ($Q_1$) by the steam reforming reaction and the calorific value ($Q_2$) by the partial oxidation reaction in the reforming reactor 2 was substantially zero, and hence it was not necessary to additionally provide a heater for heating the reforming reactor 2.

Also, in this working example, the total quantity of heat necessary for heating the materials, i.e. the methanol and water, from 20° C. to 250° C. at the flow rate specified above for vaporizing (51300 kJ/h) could be procured from the quantity of heat obtained from the reformed gas in the heat exchanger 3 (16000 kJ/h), and approx. 41% (35300 kJ/h) of the quantity of heat obtained from the catalytic combustion of the hydrogen-containing desorbed gas (86000 kJ/h) discharged from the PSA separation apparatus 5 in the catalyst combustion unit 13. Accordingly, for obtaining the total quantity of heat necessary for heating the materials, i.e. the methanol and water, from 20° C. to 250° C. at the flow rate specified above for vaporizing (51300 kJ/h), it was not necessary to supply a fuel from outside of the hydrogen production system X1 and to keep burning such fuel.

WORKING EXAMPLE 3

A hydrogen production system X2A, which is different from 25 the system of the working examples 1 and 2, was employed to produce hydrogen (hydrogen-rich gas) from a mixed material (containing methanol, water, and oxygen), in a different material supply mode from the working examples 1 and 2.

In the hydrogen production system X2A according to this working example, the tubular member 23 was provided inside the main container 21 of the reforming reactor 2, so that the reforming reaction chamber 22A was provided in place of the reforming reaction chamber 22 of the hydrogen production system X1. The tubular member 23 was constituted of a stainless steel tube (outer diameter: 114 mm, inner diameter: 110 mm, overall length: 600 mm). Incidentally to this, the location of the reformed gas outlet 212, and the piping 68 connected to the reformed gas outlet 212 were appropriately modified. In the first region 221 and the second region 222 serving as the reforming reaction chamber 22A, approx. 10 liters of the same reforming catalyst as that used in the foregoing working examples was loaded (loading height: 500 mm). Structure of other portions is similar to that of the hydrogen production system X1 according to the working examples 1, 2.

For production of hydrogen according to this working example, methanol water (20° C.) having a methanol concentration of 58.7 wt % was introduced into the heat exchanger 3 at a flow rate corresponding to supply of methanol and water at 0.45 kmol/h and 0.5625 kmol/h respectively, to the system. To the methanol water that passed through the heat exchanger 3, air was added at a flow rate of 1.02 kmol/h. Other operations were similarly performed to the working example 1.

Through such hydrogen production according to this working example, reaction rate of methanol in the reforming reactor 2A was 97.6%, hydrogen collection rate in the PSA separation apparatus 5 was 75%, and hydrogen purity of the hydrogen-rich gas was 99.9%. Also, the gained quantity of the hydrogen-rich gas of 99.9% in purity was 20.33 Nm³/h.

In this working example, the air supply was set at 1.02 kmol/h with respect to methanol supply of 0.45 kmol/h, so that the partial oxidation reaction covered approx. 20% of the autothermal reforming reaction. Also, because of the adiabatic material attached around the main container 21 of the reforming reactor 2A, heat dissipation from the main container 21 was suppressed. Therefore, the thermal energy balance between the heat adsorption ($Q_1$) by the steam reforming reaction and the calorific value ($Q_2$) by the partial oxidation reaction in the reforming reactor 2A was substantially zero, and hence it was not necessary to additionally provide a heater for heating the reforming reactor 2A.

Also, in this working example, the total quantity of heat necessary for heating the materials, i.e. the methanol and water, from 20° C. to 250° C. at the flow rate specified above for vaporizing (51300 kJ/h) could be procured from the quantity of heat obtained from the reformed gas in the heat exchanger 3 (16000 kJ/h), and approx. 41% (35300 kJ/h) of the quantity of heat obtained from the catalytic combustion of the hydrogen-containing desorbed gas (86000 kJ/h) discharged from the PSA separation apparatus 5 in the catalyst combustion unit 13. Accordingly, for obtaining the total quantity of heat necessary for heating the materials, i.e. the methanol and water, from 20° C. to 250° C. at the flow rate specified above for vaporizing (51300 kJ/h), it was not necessary to supply a fuel from outside of the hydrogen production system X2A and to keep burning such fuel.

WORKING EXAMPLE 4

A hydrogen production system X2C including a reforming apparatus different from that of the working example 3 was employed to produce hydrogen (hydrogen-rich gas) from a mixed material (containing methanol, water, and oxygen), in a different material supply mode from the working example 3.

In the hydrogen production system X2C according to this working example, the tubular member 23 provided inside the main container 21 of the reforming reactor 2 was substituted with seven stainless steel tubes (outer diameter: 50 mm, inner diameter: 48 mm, overall length: 600 mm), so that the reforming reaction chamber 22C was provided in place of the reforming reaction chamber 22A of the hydrogen production system X2A. Structure of other portions is similar to that of the hydrogen production system X2A according to the working example 3.

For production of hydrogen according to this working example, methanol water (20° C.) having a methanol concentration of 58.7 wt % was introduced into the heat exchanger 3 at a flow rate corresponding to supply of methanol and water at 0.42 kmol/h and 0.525 kmol/h respectively, to the system. To the methanol water that passed through the heat exchanger 3, oxygen was added at a flow rate of 0.2 kmol/h. Other operations were similarly performed to the working example 1. Through such hydrogen production according to this working example, reaction rate of methanol in the reforming reactor 2C was 97.6%, hydrogen collection rate in the PSA separation apparatus 5 was 80%, and hydrogen purity of the hydrogen-rich gas was 99.999%. Also, the gained quantity of the hydrogen-rich gas of 99.999% in purity was 20.24 $Nm^3$/h.

In this working example, the oxygen supply was set at 0.2 kmol/h with respect to methanol supply of 0.42 kmol/h, so that the partial oxidation reaction covered approx. 20% of the autothermal reforming reaction. Also, because of the adiabatic material attached around the main container 21 of the reforming reactor 2C, heat dissipation from the main container 21 was suppressed. Therefore, the thermal energy balance between the heat adsorption ($Q_1$) by the steam reforming reaction and the calorific value ($Q_2$) by the partial oxidation reaction in the reforming reactor 2C was substantially zero, and hence it was not necessary to additionally provide a heater for heating the reforming reactor 2C.

Also, in this working example, the total quantity of heat necessary for heating the materials, i.e. the methanol and water, from 20° C. to 250° C. at the flow rate specified above for vaporizing (48000 kJ/h) could be procured from the quantity of heat obtained from the reformed gas in the heat exchanger 3 (15800 kJ/h), and approx. 50% (32200 kJ/h) of the quantity of heat obtained from the catalytic combustion of the hydrogen-containing desorbed gas (64500 kJ/h) discharged from the PSA separation apparatus 5 in the catalyst combustion unit 13. Accordingly, for obtaining the total quantity of heat necessary for heating the materials, i.e. the methanol and water, from 20° C. to 250° C. at the flow rate specified above for vaporizing (48000 kJ/h), it was not necessary to supply a fuel from outside of the hydrogen production system X2C and to keep burning such fuel.

<Temperature Distribution in the Reforming Reaction Chamber>

In the working examples 3 and 4, the temperature distribution in the reforming reaction chamber 22A, 22C was respectively surveyed, during the normal operation after more than an hour passed since the starting up of the hydrogen production systems X2A, X2C. The investigation of the temperature distribution in the reforming reaction chambers 22A, 22C was performed by measuring the temperature of a plurality of measurement points specified in the reforming reaction chambers 22A, 22C. In the working example 3, the measurement points were located to be displaced along a predetermined axis S1, S2 (Ref. FIGS. 4A and 4B) extending along the gas flow direction in the first region 221 and the second region 222. In 15 the reforming reaction chamber 22A, a thermometer was movably placed along the axis S1 and axis S2. Then the sensor of the thermometer was sequentially shifted to the measurement points displaced along the axis S1 and axis S2, to measure the temperature of each measurement point. In the working example 4, the measurement points were located to be displaced along a predetermined axis S3, S4 (Ref. FIGS. 6A and 6B) extending along the gas flow direction in the first region 221 and the second region 222. In the reforming reaction chamber 22C, a thermometer was movably placed along the axis S3 and axis S4. Then the sensor 25 of the thermometer was sequentially shifted to the measurement points displaced along the axis S3 and axis S4, to measure the temperature of each measurement point.

Figure 10:
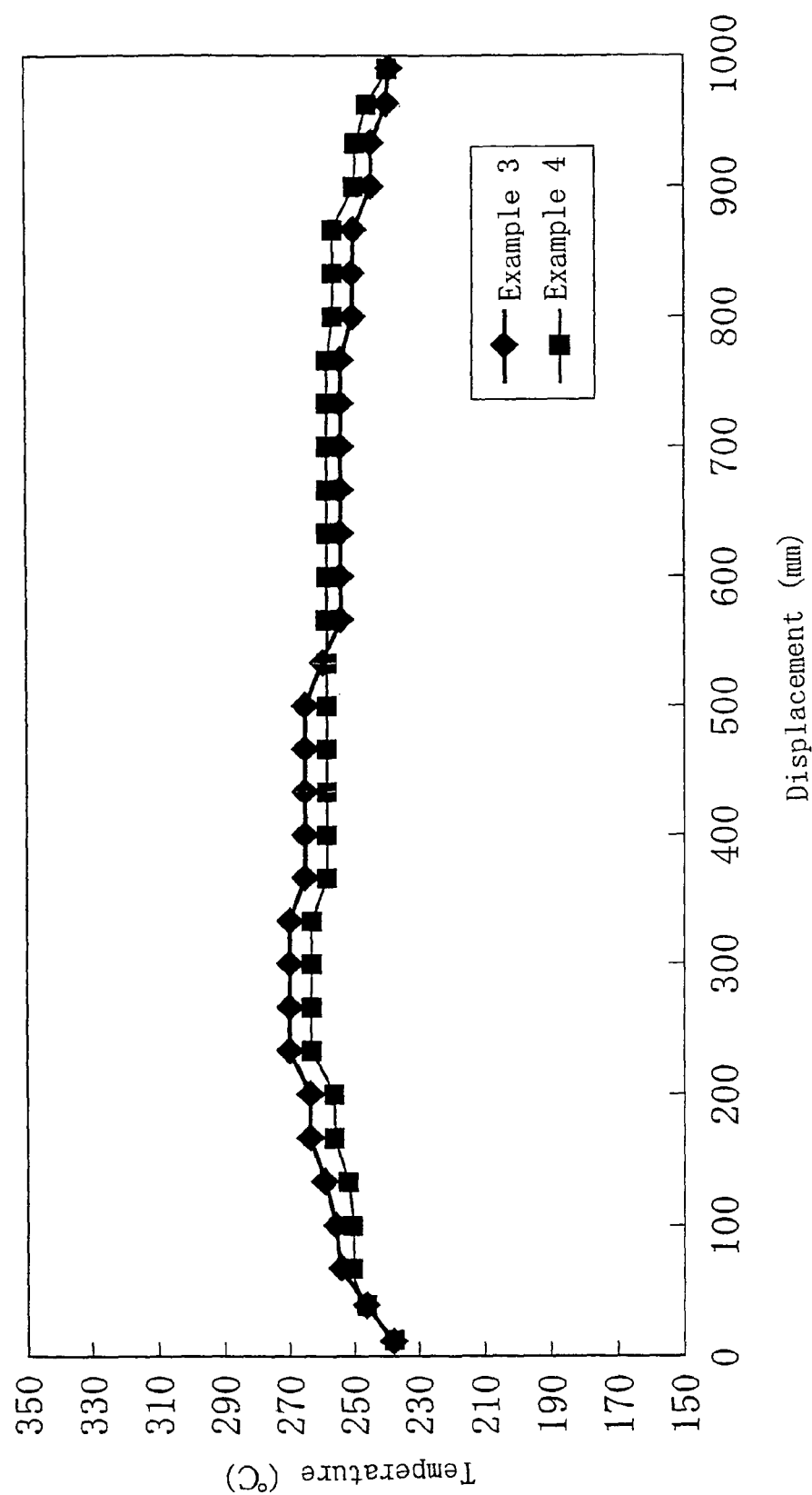
FIG. 10 is a graph showing a temperature distribution in a reforming reaction chamber according to the third and the fourth embodiment of the present invention.

FIG. 10 is a graph showing a temperature distribution in the reforming reaction chambers. The horizontal axis of FIG. 10 represents a displacement from an initial point set at the upstream side end portion of the first region 221, to the measurement point along the gas flow direction, on the passage length of 1000 mm of the reforming reaction chambers 22A, 22C in the gas flow direction (the total of the loading height of the reforming catalyst (500 mm) in the first region 221 and the loading height of the reforming catalyst (500 mm) in the second region 222). The vertical axis of FIG. 10 represents the temperature measured at each measurement point. As is apparent from FIG. 10, the temperatures at the measurement points concentrate in a relatively narrow range such as 240° C. to 270° C. in the working example 3 and 240° C. to 265° C. in the working example 4, which proves that the temperatures of the respective points in the reforming reaction chambers 22A, 22C are leveled. Presumably, this is because the thermal energy generated through the partial oxidation reaction taking place in the first region 221 is transmitted to the second region 222 via the tubular member 23. Also, in the working example 4, providing a plurality (seven pieces) of tubular members 23 resulted in increased heat-receiving area compared with the reforming reaction chamber with the single tubular member 23 as in the working example 3, thereby reducing the temperature distribution range in the reforming reaction chamber 22C.

The invention claimed is:
1. A hydrogen production system comprising:
a main container;
a vaporizer disposed in the main container for heating a mixed material containing a hydrocarbon-based material, water and oxygen for vaporizing the mixed material;
a reforming reactor disposed in the main container for causing both a steam reforming reaction of the hydrocarbon-based material and a partial oxidation reaction of the hydrocarbon-based material at a time, thereby generating reformed gas containing hydrogen out of the vaporized mixed material;
a heat exchanger disposed outside the main container for heating the hydrocarbon-based material and the water before supplying to the vaporizer, by utilizing the reformed gas as a heat source; and
a pressure-swing adsorption gas separation apparatus disposed outside the main container for executing a pressure-swing adsorption gas separation process in an adsorption tower loaded with an adsorbing agent, in which process the reformed gas is introduced into the adsorption tower to cause the adsorbing agent to adsorb to an unnecessary component in the reformed gas, hydrogen-rich gas is let out from the adsorption tower, the unnecessary component is desorbed from the adsorbing agent, and hydrogen-containing desorbed gas that contains hydrogen remaining in the adsorption tower and the unnecessary component is discharged from the adsorption tower;

wherein the vaporizer includes a combustion unit provided separately from the reforming reactor for burning the hydrogen-containing desorbed gas to heat the mixed material utilizing combustion gas, as a heat source, that is generated through the burning of the hydrogen-containing desorbed gas;

wherein the vaporizer also includes a supply tube mounted in the main container for accommodating the combustion unit inside the supply tube and for supplying the hydrogen-containing desorbed gas to the combustion unit, and a flow tube surrounding the supply tube within the main container for passing the mixed material;

wherein the flow tube includes a material inlet terminal that is led out of the main container;

wherein the reforming reactor includes a reformed gas outlet that is led out of the main container;

wherein the heat exchanger includes a first inlet for introducing the hydrocarbon-based material and the water into the heat exchanger, a first outlet connected to the material inlet terminal of the flow tube for delivering the hydrocarbon-based material and the water to the vaporizer, a second inlet connected to the reformed gas outlet of the reforming reactor for introducing the reformed gas directly from the reforming reactor into the heat exchanger, and a second outlet for delivering the reformed gas to the pressure-swing adsorption gas separation apparatus;

wherein the reforming reactor includes a first region loaded with a reforming catalyst on an upstream side for performing the partial oxidation reaction of the hydrocarbon-based material and a second region loaded with the reforming catalyst on a downstream side for performing the steam reforming reaction of the hydrocarbon-based material, the first region and the second region being located adjacent to each other via a heat conductive partition wall; and wherein the supply tube has a double-tube structure including an inner tube for introducing the hydrogen-containing desorbed gas and an outer tube for introducing oxygen-containing gas, the outer tube including a first portion accommodating the inner tube and a second portion extending beyond the inner tube for internally holding the combustion unit downstream from the inner tube, the flow tube including a spiral portion surrounding the first and second portions of the outer tube within the main container.

2. The hydrogen production system according to claim 1, wherein the hydrocarbon-based material comprises methanol.

3. The hydrogen production system according to claim 1, wherein the combustion unit is a catalyst combustion unit that executes catalytic combustion of the hydrogen-containing desorbed gas.

4. The hydrogen production system according to claim 1, wherein the vaporizer includes a heat storage unit that stores therein thermal energy possessed by the combustion gas.

5. The hydrogen production system according to claim 1, wherein the vaporizer further includes a heat storage material that stores therein gas thermal energy possessed by the combustion gas, loaded in the main container.

6. The hydrogen production system according to claim 5, wherein the heat storage material is a ceramic ball.

7. The hydrogen production system according to claim 1, wherein the flow tube is of a spiral shape.

8. The hydrogen production system according to claim 1, further comprising a heater that heats the reforming reactor utilizing the combustion gas as a heat source.

9. The hydrogen production system according to claim 1, wherein the vaporizer includes a combustion gas discharge port that is connected to a heating jacket surrounding the reforming reactor for heating the reforming reactor by utilizing the combustion gas as a heat source.

10. The hydrogen production system according to claim 1, wherein the first outlet of the heat exchanger is connected to the material inlet terminal of the flow tube via a piping to which an additional piping is connected for adding oxygen-containing gas to the hydrocarbon-based material and the water before supplying to the vaporizer.

11. A hydrogen production system comprising:
a main container;
a vaporizer disposed in a main container for heating a mixed material containing a hydrocarbon-based material, water and oxygen for vaporizing the mixed material;
a reforming reactor that causes both a steam reforming reaction of the hydrocarbon-based material and a partial oxidation reaction of the hydrocarbon-based material at a time, thereby generating reformed gas containing hydrogen out of the vaporized mixed material; and
a pressure-swing adsorption gas separation apparatus that executes a pressure-swing adsorption gas separation process in an adsorption tower loaded with an adsorbing agent, in which process the reformed gas is introduced into the adsorption tower to cause the adsorbing agent to adsorb an unnecessary component in the reformed gas, hydrogen-rich gas is let out from the adsorption tower, the unnecessary component is desorbed from the adsorbing agent, and hydrogen-containing desorbed gas that contains hydrogen remaining in the adsorption tower and the unnecessary component is discharged from the adsorption tower;

wherein the vaporizer includes a combustion unit provided separately from the reforming reactor for burning the hydrogen-containing desorbed gas to heat the mixed material utilizing combustion gas, as a heat source, that is generated through the burning of the hydrogen-containing desorbed gas;

wherein the reforming reactor includes a first region loaded with a reforming catalyst on an upstream side for performing the partial oxidation reaction of the hydrocarbon-based material and a second region loaded with the reforming catalyst on a downstream side for performing the steam reforming reaction of the hydrocarbon-based material, the first region and the second region being located adjacent to each other via a heat conductive partition wall;

wherein the vaporizer also includes a supply tube mounted in the main container for accommodating the combustion unit inside the supply tube and for supplying the hydrogen-containing desorbed gas to the combustion unit, and a flow tube surrounding the supply tube within the main container for passing the mixed material; and wherein the supply tube has a double-tube structure including an inner tube for introducing the hydrogen-containing desorbed gas and an outer tube for introducing oxygen-containing gas, the outer tube including a first portion accommodating the inner tube and a second portion extending beyond the inner tube for internally holding the combustion unit downstream from the inner tube, the flow tube including a spiral portion surrounding the first and second portions of the outer tube within the main container.

12. A hydrogen production system comprising:

a main container;

a vaporizer disposed in the main container for heating a mixed material containing a hydrocarbon-based material, water and oxygen for vaporizing the mixed material;

a reforming reactor that causes both a steam reforming reaction of the hydrocarbon-based material and a partial oxidation reaction of the hydrocarbon-based material at a time, thereby generating reformed gas containing hydrogen out of the vaporized mixed material; and a pressure-swing adsorption gas separation apparatus that executes a pressure-swing adsorption gas separation process in an adsorption tower loaded with an adsorbing agent, in which process the reformed gas is introduced into the adsorption tower to cause the adsorbing agent to adsorb an unnecessary component in the reformed gas, hydrogen-rich gas is let out from the adsorption tower, the unnecessary component is desorbed from the adsorbing agent, and hydrogen-containing desorbed gas that contains hydrogen remaining in the adsorption tower and the unnecessary component is discharged from the adsorption tower;

wherein the vaporizer includes a combustion unit provided separately from the reforming reactor for burning the hydrogen-containing desorbed gas to heat the mixed material utilizing combustion gas, as a heat source, that is generated through the burning of the hydrogen-containing desorbed gas;

wherein the vaporizer also includes a supply tube mounted in the main container for accommodating the combustion unit inside the supply tube and for supplying the hydrogen-containing desorbed gas to the combustion unit, and a flow tube surrounding the supply tube within the main container for passing the mixed material; and wherein the supply tube has a double-tube structure including an inner tube for introducing the hydrogen-containing desorbed gas and an outer tube for introducing oxygen-containing gas, the outer tube including a first portion accommodating the inner tube and a second portion extending beyond the inner tube for internally holding the combustion unit downstream from the inner tube, the flow tube including a spiral portion surrounding the first and second portions of the outer tube within the main container.

* * * * *